(12) United States Patent
Nishikawa et al.

(10) Patent No.: US 6,937,913 B2
(45) Date of Patent: Aug. 30, 2005

(54) PRODUCT DESIGN PROCESS AND PRODUCT DESIGN APPARATUS

(75) Inventors: Akihito Nishikawa, Kanagawa-ken (JP); Yoshihiro Motowaki, Kanagawa-ken (JP); Toshio Yonezawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 606 days.

(21) Appl. No.: 09/918,303

(22) Filed: Jul. 30, 2001

(65) Prior Publication Data

US 2002/0077882 A1 Jun. 20, 2002

(30) Foreign Application Priority Data

Jul. 28, 2000 (JP) ........................................ 2000-229771
Jul. 25, 2001 (JP) ..................................... P2001-225079

(51) Int. Cl.⁷ ............................................. G06F 19/00
(52) U.S. Cl. ........................................ 700/103; 705/10
(58) Field of Search ................................ 700/95–98 M, 700/103, 106–109, 117, 233; 705/7, 10, 26, 2

(56) References Cited

U.S. PATENT DOCUMENTS

| | | | |
|---|---|---|---|
| 5,550,746 A | * 8/1996 | Jacobs | 700/231 |
| 5,717,598 A | * 2/1998 | Miyakawa et al. | 700/103 |
| 5,732,200 A | 3/1998 | Becker et al. | |
| 5,754,738 A | 5/1998 | Saucedo et al. | |
| 5,963,910 A | 10/1999 | Ulwick | |
| 2002/0004749 A1 | * 1/2002 | Froseth et al. | 705/16 |

OTHER PUBLICATIONS

O' Connor et al., "Designing Environmental Considerations in to Products– A novel Qualitative Life Cyce Aprroach", 1997 IEEE.*

Doukas et al., "A Spreadsheet Implementation Of QFD And Systems Engineering Approaches To Support Concurrent Engineering" Jul. 31, 1997, Innovation in Technology Management.*

Suther et al., "Customer Requirements Research: Providing Input to Quality Function Deployment", May 6, 1994 IEE Colloquium.*

Kao et al., "Consumer–Centered Product Design Specifications Using Fuzzy Multivariate Regression Analysis", Apr. 28, 1193, Uncertainly Modeling and Analysis.*

Rodgers et al., "Evaluating the Relationship between Product and User", 1994, The Institution of Electrical Engineers.*

* cited by examiner

*Primary Examiner*—Leo Picard
*Assistant Examiner*—Chad Rapp
(74) *Attorney, Agent, or Firm*—Brenda O. Holmes; Kilpatrick Stockton LLP

(57) ABSTRACT

Disclosed herein are a product design process and apparatus for quickly and easily defining an optimal product concept capable of conveying a high degree of customer satisfaction. In the process of the present invention, wants and needs information is analyzed, and, based on the analyzed wants and needs information, weighting is carried out with respect to evaluation indices which have been previously stored in a storage device and which are quantitative measures of the degree to which the user is likely to perceive a benefit latent in the product under consideration and inherent in the wants and needs information to have been achieved, an evaluation index having the highest weighting among a plurality of weighted evaluation indices is selected as a primary evaluation index and a product design concept for which the primary evaluation index selected is a maximum or minimum is defined.

17 Claims, 20 Drawing Sheets

FIG.7

| DESIRED QUALITIES | WEIGHT | Graphic data processing (dots/sec) | Internal parallel data transfer rate (Mbyte/sec) | DMA data transfer rate (Mbyte/sec) | External parallel data transfer rate (bps) | Initial defect rate (ppm) | High-performance rating (units) | EVALUATION INDICES (Worse 1 — Better 5) |
|---|---|---|---|---|---|---|---|---|
| Software development is easy | 4.55 | 3 | | | | | | X at 5 |
| Capable of high-speed data transfer within set | 5.45 | | 9 | 3 | 1 | | | X at 4 |
| Capable of high-speed image processing | 7.27 | 9 | 3 | 3 | | | | X at 5 |
| Capable of high-speed communication with set exterior | 3.64 | | | | 9 | | | X at 3 |
| Can be used with confidence | 10.00 | | | | | 9 | | X at 3 |
| Allows for easy improvement of functionality in future models | 8.18 | 3 | | | | | 9 | X at 4 |
| Consumes little electrical power | 1.00 | 3 | | | | | | X at 1 |
| SCORE | | 107 | 71 | 27 | 38 | 90 | 74 | |
| NORMALIZED SCORE | | 0.26 | 0.17 | 0.07 | 0.09 | 0.22 | 0.18 | |

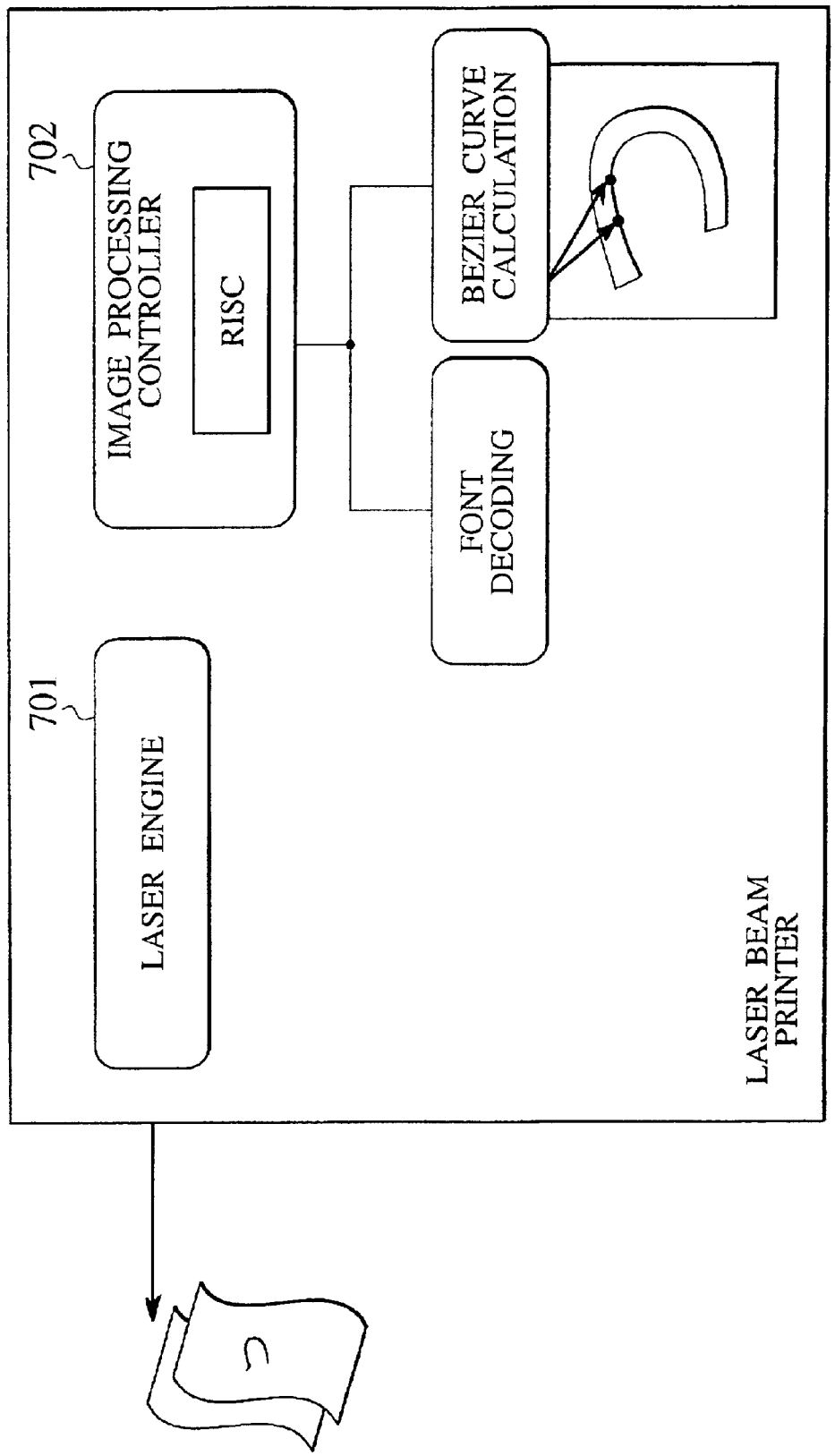

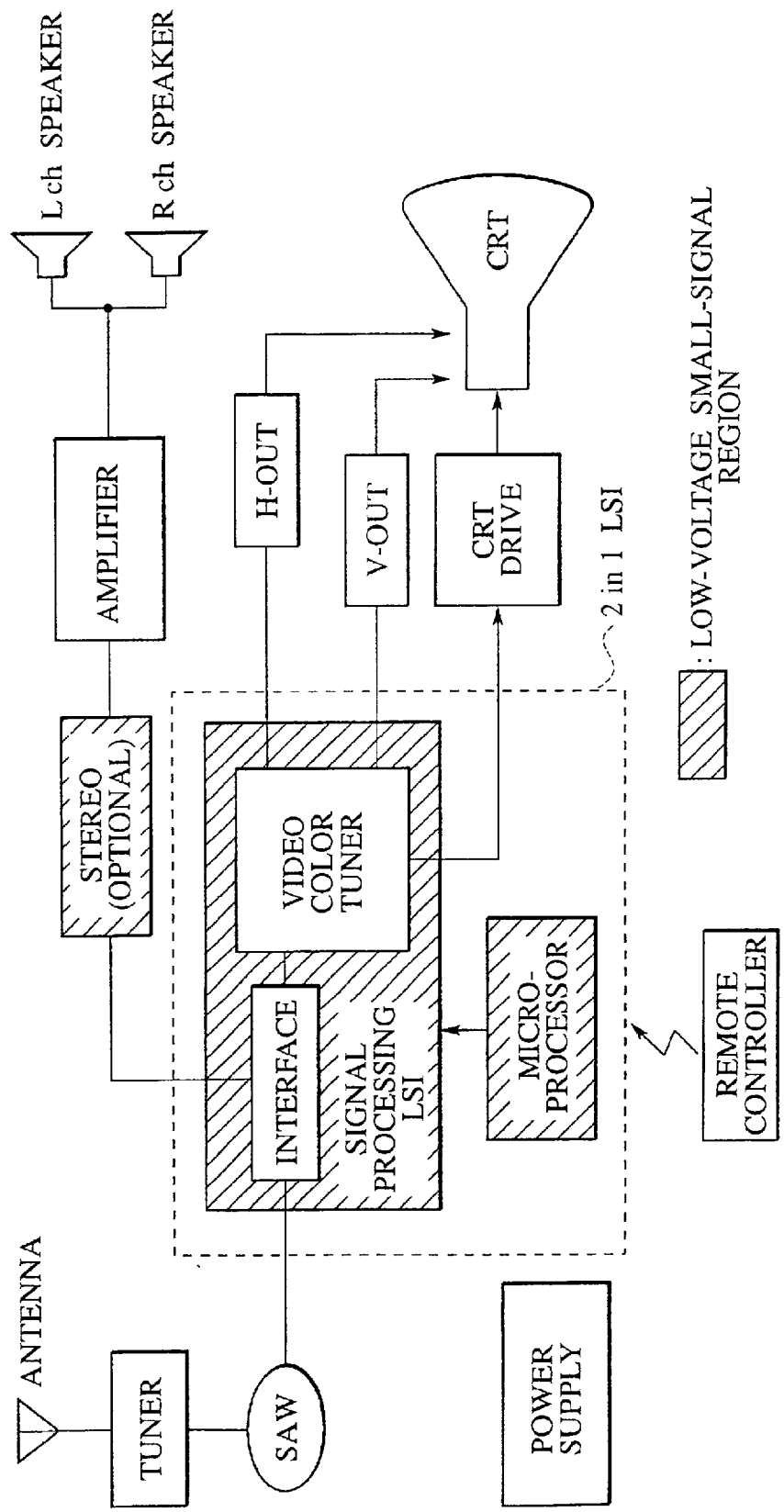

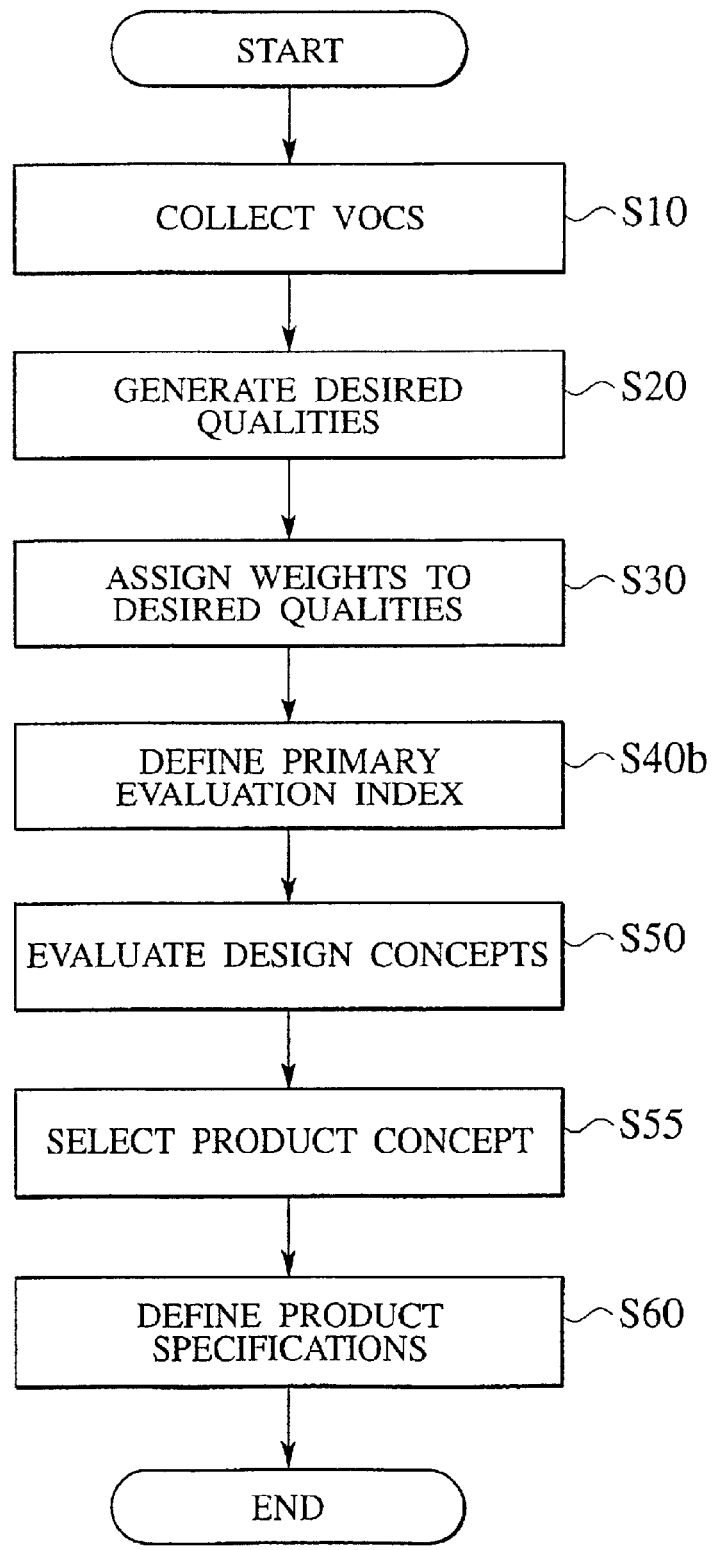

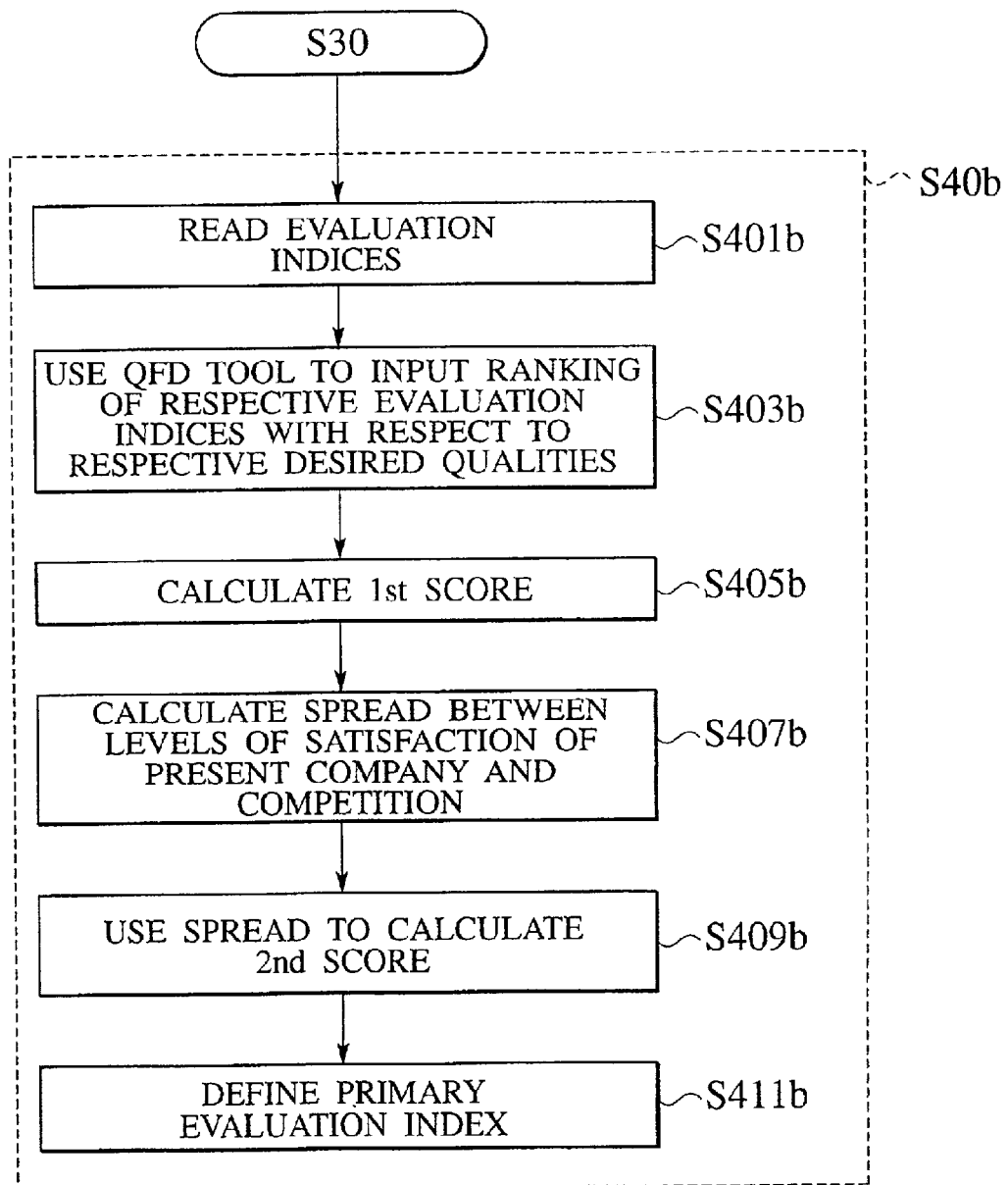

FIG.14

| Evaluation indices | Sound quality | Image quality | Reliability | Maintenance is easy | Software development is easy | Development cycle is short | Cost of manufacturing set is low | Low interference | Low electrical power consumption | Many functions | Text shape | Low design cost | Score | Normalized score |
|---|---|---|---|---|---|---|---|---|---|---|---|---|---|---|
| Design cost of chip | | | | | | | 3 | | | | | 9 | 57 | 0.05 |
| Design cost of set | | | | | | | 9 | | | | | | 63 | 0.06 |
| TV adjustment time | | | | | | 9 | 3 | | | | | | 84 | 0.08 |
| Electrical power consumption (Watts) | | | | | | | | | 9 | | | | 36 | 0.03 |
| OSD font (X · Y) | | | | | | | | | | | 9 | | 36 | 0.03 |
| I/O pins | | | | | | | | | | 9 | | | 36 | 0.03 |
| Memory capacity (kB) | | | | | | | | | | 9 | | | 36 | 0.03 |
| Microprocessor noise interference (dB) | | | | | | | | 9 | | | | | 30 | 0.03 |
| External parts count | | | | | | | 9 | | | | | | 63 | 0.06 |
| ROM replacement time (programming) | | | | | | 9 | | | | | | | 63 | 0.06 |
| Software development cost | | | | | 9 | | | | | | | | 63 | 0.06 |
| Diagnostic cost | | | | 3 | | | | | | | | | 21 | 0.02 |
| Minimum dielectric breakdown voltage (V) | | | 9 | | | | | | | | | | 81 | 0.08 |
| MTBF | | | 9 | | | | | | | | | | 81 | 0.08 |
| Input sensitivity (dB μV) | 3 | 3 | | | | | | | | | | | 54 | 0.05 |
| Video frequency bandwidth (MHz) | | 3 | | | | | | | | | | | 27 | 0.03 |
| Video S/N (dB) | | 9 | | | | | | | | | | | 81 | 0.08 |
| Total harmonic distortion (%) | 9 | | | | | | | | | | | | 81 | 0.08 |
| Audio S/N (dB) | 9 | | | | | | | | | | | | 81 | 0.08 |
| Prioritization of desired qualities | 9 | 9 | 9 | 7 | 7 | 7 | 7 | 4 | 4 | 4 | 4 | 4 | | |

Weight of each index

PRODUCT DESIGN PROCESS AND PRODUCT DESIGN APPARATUS

CROSS-REFERENCE TO RELATED APPLICATIONS

This application is based upon and claims the benefit of priority from the prior Japanese Patent Applications No.2000-229771, filed on Jul. 28, 2000 and No.2001-225079, filed on Jul. 25, 2001; the entire contents of which are incorporated herein by reference in its entirety.

BACKGROUND OF THE INVENTION

1. Field of the Invention

The present invention relates to a product design process, a product design apparatus, and a recording medium for storing a product design program. More particularly, the present invention relates to art for quickly and easily planning and developing, and rapidly getting to market with, a product or service embodying a product design concept that conveys a high degree of customer satisfaction, which is to say a high degree of market competitiveness, and that permits the true wants and needs for the product or service in question which are inherent in the "voice of the customer" to be appropriately reflected during the stages of product planning and design at which design specifications for new products are being defined based on various wants and needs of users for that product or service.

2. Description of the Background Art

In planning and development of products and services embodying new product design concepts, the "voice of the customer" (VOC) with regard to wants and needs for that product or service is normally sought through interviews, questionnaire-type surveys, and so forth targeting customers or end-users (both of which are hereinafter collectively referred to as "users"). In conventional product design, the proposition has been to develop products having design concepts and design specifications which faithfully incorporate the content of the raw VOCs without refinement or modification, this representing the wants and needs as collected from those users, and to get to market with such products as early as possible before the competition. Areas addressed in the VOCs but which cannot be implemented in product must be negotiated with the customer and appropriate adjustment carried out; what matters of course is performance relative to the competition, and it is possible to some extent to compensate for shortcomings through price, customer service, technical support, and so forth. In the interest of quickly getting to market with a product that will satisfy the user, there are many cases where it is in fact not possible to achieve the performance demanded by the user in the VOC despite the best efforts during design and planning to incorporate the VOC into product. As a result, windows for successful product entry on the market are frequently missed, and many products which could have been successful are not as well-received as they might otherwise have been.

Here, it has conventionally been the content of the raw VOCs as collected from the users which forms the basis for the design specifications that define the product on behalf of which so much effort is being expended. That is, the common belief has been that if the voice of the customer is not faithfully reflected in the design specifications of the product, the user will have no use for the product that is ultimately put on the market, resulting in a missed business opportunity for the manufacturer. For this reason, despite the substantial risks that this represents for product design and development, manufacturers have, in order to lead the competition, put their efforts into development of techniques to produce products wherein the VOCs gathered from users themselves constitute the product design constraints employed during product design.

However, conventional product design has had the following problems for which solutions are sought.

The raw VOC, coming as it does from the user and conventionally thought of as a blueprint for design specifications without the need for further refinement or modification, will often, (1) particularly in the case of high-volume users of current products, staff responsible for accounts of various manufacturers at parts suppliers, or the like, consist of comments which indicate particular desired values in the context of some specific implementation (e.g., "we would like the RISC chip to function at 200 MHz or better") or comments which are easily understood within the constraints of current product (e.g., "it would be nice to have floating point processor capability and PCI—Peripheral Component Interconnect—interface capability"). For this reason, whatever new design concepts have been obtainable from such VOCs have reflected product concepts that were little more than linear extensions of current product, and it has only been possible to obtain product concepts for fixed implementations; i.e., product concepts within the general framework of current product specifications.

On the other hand, (2) particularly in the case of end-users, as comments often list what users would like to ideally see in the future and such VOCs frequently only have meaning at an extremely vague level (e.g., "make it print better"), it has not been possible to efficiently refine such vague VOCs into product design concepts in a way that would allow them to be linked to particular product specifications.

Moreover, when one approaches a user as mentioned above and solicits VOCs from the user in the form of interviews, questionnaire-type surveys, and the like, the user tends not to respond as naturally as he or she might, and it has not been possible to elicit the true wants and needs of the user for the product.

With conventional product planning, it has thus not been possible, based on raw VOCs as gathered from users—these having neither been refined nor modified—to obtain appropriate design concepts, and furthermore, despite incorporation of such raw VOCs into product concepts it has been extremely difficult to achieve a product having specifications capable of truly satisfying users. Accordingly, costs associated with planning and development of new products have increased, and it has moreover been extremely difficult to quickly get to market with a successful product having good market competitiveness.

SUMMARY OF THE INVENTION

In the embodiments of the present invention described below, as measures of the degree to which each product concept among a many-membered set of product concepts satisfies the wants and needs of the user, we introduce a number of evaluation indices for quantitative evaluation thereof, and we use one or more of those evaluation indices, weighted based on evaluation by the user, for the purpose of defining a product concept or concepts. That is, the product design concept for which this weighted evaluation index (hereinafter referred to as the "primary evaluation index") is either a maximum or minimum is characteristically selected as the best product design concept, i.e., the product design concept which stands to be the most well-received by the user, and design and development are carried out with the goal of producing a product having product specifications consistent with that product concept. This allows the voice of the user to be accurately captured and refined, allowing critical features (i.e., a domain) to be targeted so that a product design concept can be selected from the outset from the many possible variations on product specifications, and makes it possible to quickly and easily obtain a product concept not constrained by current product specifications and possessing a high number of degrees of freedom.

One aspect of the present inventions is a process for designing a product automatically in accordance with a desired product design concept for a product under consideration, said process comprising: analyzing wants and needs information which has been input with respect to the product under consideration; based on the aforesaid analyzed wants and needs information, carrying out weighting with respect to evaluation indices which are quantitative measures of the degree to which the user is likely to perceive a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum.

Another aspect of the present invention is a process for designing a product in accordance with a desired product design concept for a product under consideration, said process comprising: carrying out, based on wants and needs information which reflects the wants and needs of the user with respect to the product under consideration, weighting with respect to evaluation indices which are quantitative measures of the degree to which the user is likely to perceive a benefit latent in the product under consideration and inherent in the aforesaid wants and needs information to have been achieved, and selecting at least one index among a plurality of such weighted evaluation indices is selected as a primary evaluation index; and defining at least one product design concept for which the primary evaluation index selected at the aforesaid primary evaluation index selection step is a maximum or minimum.

Another aspect of the present invention is a method of assisting in design of a product that uses a computer to acquire information indicating wants and needs of a user with respect to a product under consideration, said method comprising: prompting user to input the wants and needs information by way of a wants and needs information input/output equipment provided at the product or at apparatus containing the product; and sending the wants and needs information input by the user by way of the aforesaid wants and needs information input/output equipment to a server.

Another aspect of the present invention is an apparatus for designing a product, using a computer in accordance with a desired product design concept for a product under consideration, said apparatus comprising: an analyzer that analyzes wants and needs information which has been input with respect to the product under consideration; a primary evaluation index definer that, based on said analyzed wants and needs information, carries out weighting with respect to evaluation indices which have been previously stored in a storage device and which are quantitative measures of the degree to which the user is likely to perceive a benefit latent in the product under consideration and inherent in said wants and needs information to have been achieved, and that selects at least one index among a plurality of such weighted evaluation indices as a primary evaluation index; and a product concept evaluator that defines at least one product design concept for which the primary evaluation index selected by said primary evaluation index definer is a maximum or minimum.

Another aspect of the present invention is a product design terminal device which uses a computer to acquire, at a user's site, information indicating wants and needs of the user with respect to a product under consideration, said product design terminal device comprising: an input unit that prompts user to input said wants and needs information with respect to the product by way of a wants and needs information input/output equipment provided at the product or at a product containing the product; and a sending unit that sends to a server said wants and needs information which was input from the user by way of said wants and needs information input/output equipment. Another aspect of the present invention is a computer-readable recording medium for storing a program capable of causing a computer to perform product design processing in accordance with a desired product design concept for a product under consideration, the aforesaid product design processing comprising: analysis processing for analyzing wants and needs information which has been input with respect to the product under consideration; primary evaluation index selection processing for carrying out, based on said analyzed wants and needs information, weighting with respect to evaluation indices which have been previously stored in a storage device and which are quantitative measures of the degree to which the user is likely to perceive a benefit latent in the product under consideration and inherent in the aforesaid wants and needs information to have been achieved, and selecting at least one index among a plurality of such weighted evaluation indices as a primary evaluation index; and product concept definition processing for defining at least one product design concept for which the primary evaluation index selected by said primary evaluation index selection processing is a maximum or minimum. Another aspect of the present invention is a computer-readable recording medium for storing a program capable of causing a computer to perform product design terminal processing for acquiring, at a user's site, information indicating wants and needs of the user with respect to a product under consideration, said product design terminal processing comprising: input processing for prompting user to input said wants and needs information with respect to the product by way of a wants and needs information input/output equipment provided at the product under consideration or at a product containing that product; and sending processing for sending to a server said wants and needs information which was input from the user by way of said wants and needs information input/output equipment. Another aspect of the present invention is a computer program capable of causing a computer to perform product design processing in accordance with a desired product design concept for a product under consideration, the aforesaid product design processing comprising: analysis processing for analyzing wants and needs information which has been input with respect to the product under consideration; primary evaluation index selection processing for carrying out, based on said analyzed wants and needs information, weighting with respect to evaluation indices which have been previously stored in a storage device and which are quantitative measures of the degree to which the user is likely to perceive a benefit latent in the product under consideration and inherent in the aforesaid wants and needs information to have been achieved, and selecting at least one index among a plurality of such weighted evaluation indices as a primary evaluation index; and product concept definition processing for defining at least one product design concept for which the primary evaluation index selected by said primary evaluation index selection processing is a maximum or minimum.

Another aspect of the present invention is a computer program capable of causing a computer to perform product design terminal processing for acquiring, at a user's site, information indicating wants and needs of the user with respect to a product under consideration, said product design terminal processing comprising: input processing for prompting user to input said wants and needs information with respect to the product by way of a wants and needs information input/output equipment provided at the product under consideration or at a product containing that product; and sending processing for sending to a server said wants and needs information which was input from the user by way of said wants and needs information input/output equipment.

Other features and advantages of the present invention will become apparent from the following description taken in conjunction with the accompanying drawings.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a drawing showing an example of the image on an input/output screen which appears during the weighting of evaluation indices which is carried out by a primary evaluation index definer 30;

FIG. 8 is a functional block diagram of a laser beam printer, this printer being used as an example of a product to which the present invention may be applied;

FIG. 11 is a functional block diagram of a TV system, this system being presented as an example of a product comprising a product to which the present invention may be applied, which example is provided for purposes of explaining a product design apparatus associated with a second embodiment of the present invention;

FIG. 12 is a flowchart showing the sequence of processing in a product design process associated with a second embodiment of the present invention;

FIG. 13 is a flowchart showing various details in connection with the primary evaluation index definition processing carried out by a primary evaluation index definer 30 associated with a second embodiment of the present invention;

FIG. 14 is a drawing showing an example of the content of an input/output screen for calculating weights of respective evaluation indices employed in primary evaluation index definition processing carried out by a primary evaluation index definer 30 associated with a second embodiment of the present invention;

DETAILED DESCRIPTION OF THE PREFERRED EMBODIMENTS

First Embodiment

Below, with reference to FIGS. 1 through 10, we give a detailed description of a product design process, a product design apparatus, and a computer-readable recording medium for storing a product design program which are respectively associated with a first embodiment of the present invention.

A first embodiment of the present invention provides functionality for analyzing VOCs containing wants and needs of users with respect to a particular product, for extracting therefrom true wants and needs (these being attributes that cause the customer to feel that he or she derives some benefit that lies latent in the product), for causing weighting of these true wants and needs by the user, and for using an evaluation index (primary evaluation index) which is highly correlated to these weighted true wants and needs to define a product concept.

Figure 1:
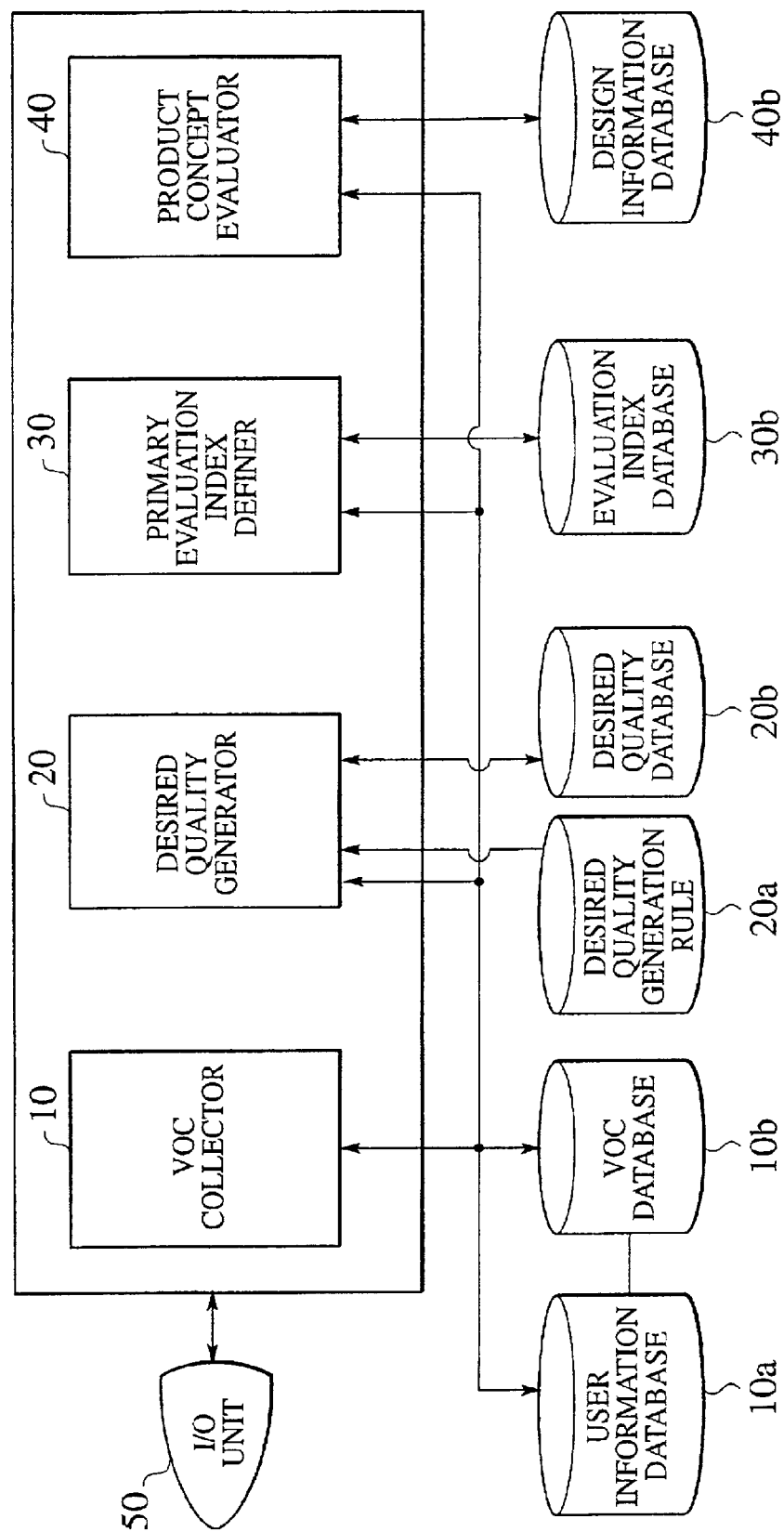
FIG. 1 is a block diagram showing the functional configuration of a product design apparatus associated with a first embodiment of the present invention.

FIG. 1 is a block diagram showing the functional configuration of a product design apparatus associated with a first embodiment of the present invention.

Note that as used in the present specification the word "product" includes not only tangible products but also intangible services and the like.

Referring to FIG. 1, a product design apparatus 100 associated with a first embodiment of the present invention is equipped with a VOC collector 10, a user information database 10a, a VOC database 10b, a desired quality generator 20, a desired quality generation rule 20a, a desired quality database 20b, a primary evaluation index definer 30, an evaluation index database 30b, a product concept evaluator 40, a design information database 40b, and an I/O unit 50.

The VOC collector 10 collects VOCs which express the wants and needs of the user with respect to a particular product (i.e., the voice of the customer), passing same to the desired quality generator 20 and also storing same in the VOC database 10b; and furthermore, when a VOC is collected, information identifying the user who is entering the VOC, situational information indicating the circumstances under which the product is being used, and the like are stored in user information database 10a as user attribute information. Note that these VOCs may comprise audio information from the user stored in the form of speech information, or such content may be transcribed and stored as linguistic information.

The desired quality generator 20 applies the desired quality rule 20a to the VOC passed thereto from the VOC collector 10, converting it to a desired quality, and this is stored in the desired quality database 20b. This "desired quality," being information regarding wants and needs which are likely to be perceived as true benefits by the user, is information indicating the product usage attributes that are required by the user for the product in question, these being obtained by application of the desired quality generation rule 20a, being a prescribed rule to be described below, from user VOCs which record the wants and needs of the user in varying degrees of specificity or ambiguity and which run the gamut from mere statements of numeric targets to statements about required functionality, and so forth. For example, taking the case of a laser beam printer as the product in question, the aforementioned VOCs "we would like the RISC chip to function at 200 MHz or better" and "it would be nice to have floating point processor capability and PCI (Peripheral Component Interconnect) interface capability" might be converted to the desired quality "capable of printing fonts (typefaces) at high speed."

The primary evaluation index definer 30 assigns weights to respective evaluation indices, performing calculations for grading based on correlation between desired qualities generated by the desired quality generator 20 and each of a number of evaluation indices previously stored in the evaluation index database 30b for the product in question or for a group of such products, and determines an evaluation index perceived by the user to be the most important measure with respect to product evaluation for the product in question. Here, it is desirable that the evaluation index, being a measure of the degree to which the user perceives himself or herself to have derived a benefit that was latent in the product in question, be both quantifiable and measurable, and be an index that lends itself to quantitative, numeric evaluation. For example, taking the case of a laser beam printer, an example of a primary evaluation index would be "dots/sec," this indicating the number of font dots which the printer can print per second. Furthermore, the desired qualities which are to be graded based on correlation to each of a number of evaluation indices may, prior to their being employed in grading calculations, first be weighted themselves based on evaluation previously carried out through user questionnaires or the like.

The product concept evaluator 40 refers to past design information (sets of product concepts and product design specifications corresponding thereto) stored in the design information database 40b, and selects a product concept for which the primary evaluation index defined by the primary evaluation index definer 30 is either a maximum or a minimum.

The I/O unit 50, for example during evaluation of correlation between a set of desired qualities and a set of evaluation indices, provides input/output screens to the designer and exchanges information input thereto with the primary evaluation index definer 30 by way of various input and output devices. Furthermore, an I/O unit 50b or 50c, shown in FIG. 5, prompts the user for input of VOCs and sends VOCs which have been entered to the product design apparatus 100 while also inputting evaluation points as necessary from the user to the product design apparatus 100.

We next describe the sequence of processing in a product design process associated with a first embodiment of the present invention.

Figure 2:
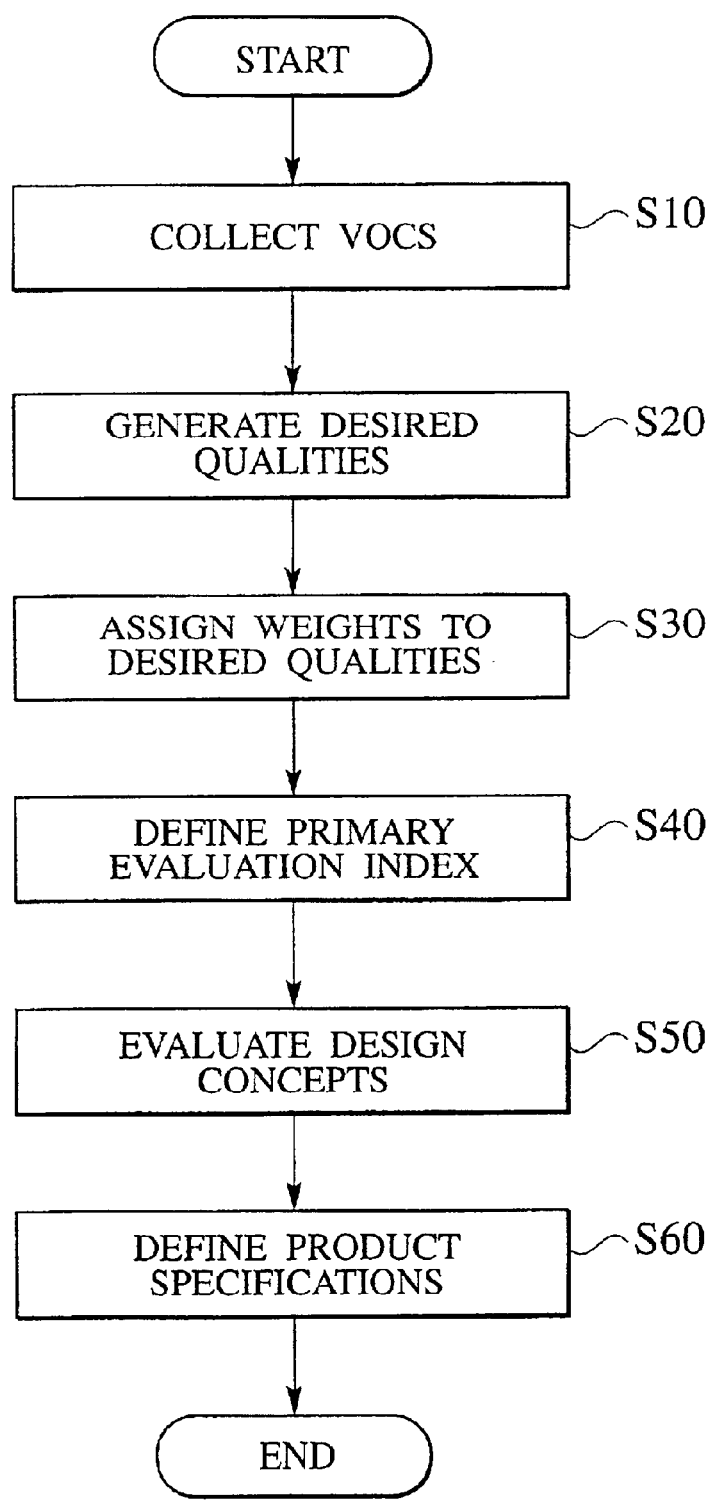
FIG. 2 is a flowchart showing the sequence of processing in a product design process associated with an embodiment of the present invention.

FIG. 2 is a flowchart showing an outline of the processing algorithm in a product design process associated with a first embodiment of the present invention.

The VOC collector 10 determines which user or users is or are most appropriate for collection of VOCs, and then collects VOCs from the customers, end-users, or the like who fall within the range of users so determined (step S10).

The desired quality generator 20 analyzes the VOCs which have been collected and determines what the true desires of the user are which are contained in the VOCs and what it is that the user would ultimately perceive to be beneficial in the product in question, thus extracting therefrom wants and needs information which reflects the wants and needs of the user, or desired qualities (step S20).

After a plurality of—e.g. on the order of 10 to 15—desired qualities have been extracted from the VOCs by the desired quality generator 20 or the primary evaluation index definer 30, in order to obtain an indication of which desired qualities are more important and which desired qualities are less important, the user is made to rank these desired qualities in terms of importance; e.g., through use of a questionnaire-type procedure by way of I/O unit 50 (step S30).

The primary evaluation index definer 30 evaluates evaluation indices, which represent measures for quantitative measurement of product concepts, and evaluates which evaluation indices are important for the product in question from the strength of the correlation (relationship) to desired qualities weighted at step S30 through employment, for example, of a matrix table or the like applying QFD (Quality Function Deployment) methodology. An evaluation index thus determined to be important is taken to be a primary evaluation index (step S40).

The way in which this primary evaluation index is determined (i.e., through maximization or minimization) is an important aspect of product concept definition in the first embodiment. The product concept evaluator 40 generates a plurality of product concepts to be measured using a primary evaluation index reflecting VOCs and desired qualities, and evaluates this plurality of product concepts using a primary evaluation index (step S50). The product concepts which are generated here are analyzed in terms of factors such as, for example, price, technical level, development time, and so forth, and design specifications to be used for the product under development are defined (step S60).

Actual design proceeds based on the product concept selected here. While product design specifications literally identical to the VOCs stated by the user do not necessarily result from product design and development carried out in accordance with the processes indicated at the foregoing steps S10 through S60, product concepts which are inherent within the user's VOCs and which reflect the true wants and needs of the user, which are cheaper in cost and possess more degrees of freedom, and which are capable of achieving high customer satisfaction, can be generated by quantitative evaluation through employment of primary evaluation indices.

Figure 3:
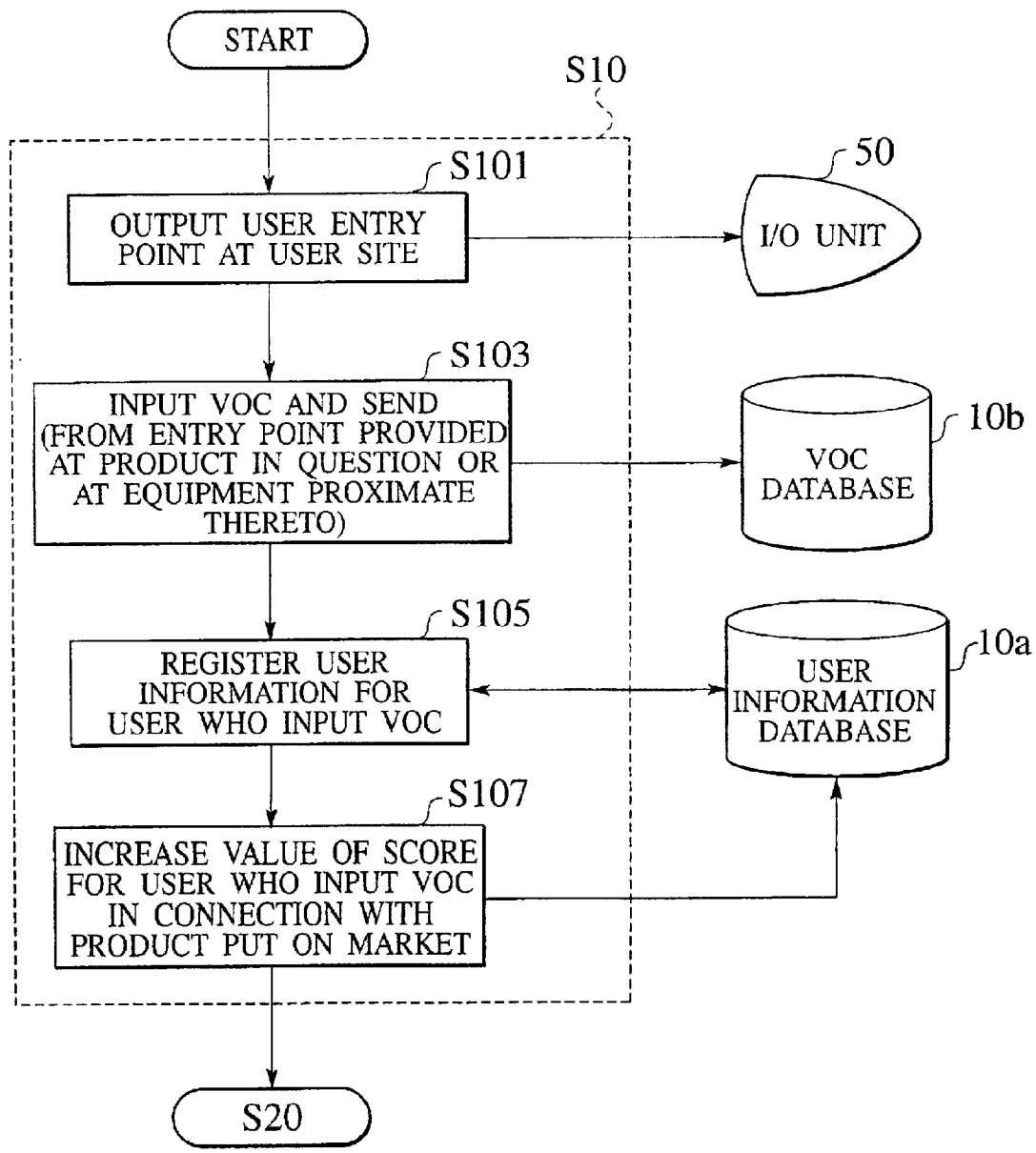
FIG. 3 is a flowchart showing various details in connection with the VOC collection processing that takes place at the VOC collection step S10 in FIG. 2.

FIG. 3 is a flowchart showing the detailed sequence of processing during the VOC collection processing which is carried out by the VOC collector 10.

Referring to FIG. 3, at VOC collection step S10, a VOC entry point is presented to the user (step S101). This "entry point" refers to inputting means, provided at a particular product, for collection of VOCs from a user. The thing that is important in the processes up to and including definition of specifications is how well the true wants and needs of the user with respect to the product in question can be collected in the form of VOCs, and whether a productive survey of such wants and needs can be carried out. The first embodiment provides an entry point capable of capturing a VOC at a time when a user is using the product in question, or, where the product in question is a component, is using equipment containing the product in question, which is to say at a time when the user is likely to have an opinion with regard to that product.

Specifically, means for capturing a VOC (i.e., an entry point) provided at a particular product available to the user or at equipment available to the user and containing that product causes the user to himself or herself enter his or her opinion right then and there from an entry point at the product in question or at equipment in the vicinity of the product in question at a time when the user has an opinion during his or her use of that product (step S103).

For example, in the case where the user is a customer developing a product using a semiconductor component employed in a household appliance product (e.g., development staff at a manufacturer which provides a household appliance product incorporating a supplied component), design might proceed using an ordinary personal computer. Because a personal computer is therefore available for design at the site where the semiconductor component is being used, a website provided by the semiconductor component manufacturer can be accessed immediately. As shown at 50*b* in FIG. 5, in the example under discussion, a VOC entry point may be provided at the manufacturer's website, allowing input of wants and needs with respect to the semiconductor component at the very time that the user becomes aware of them during development.

Figure 5:
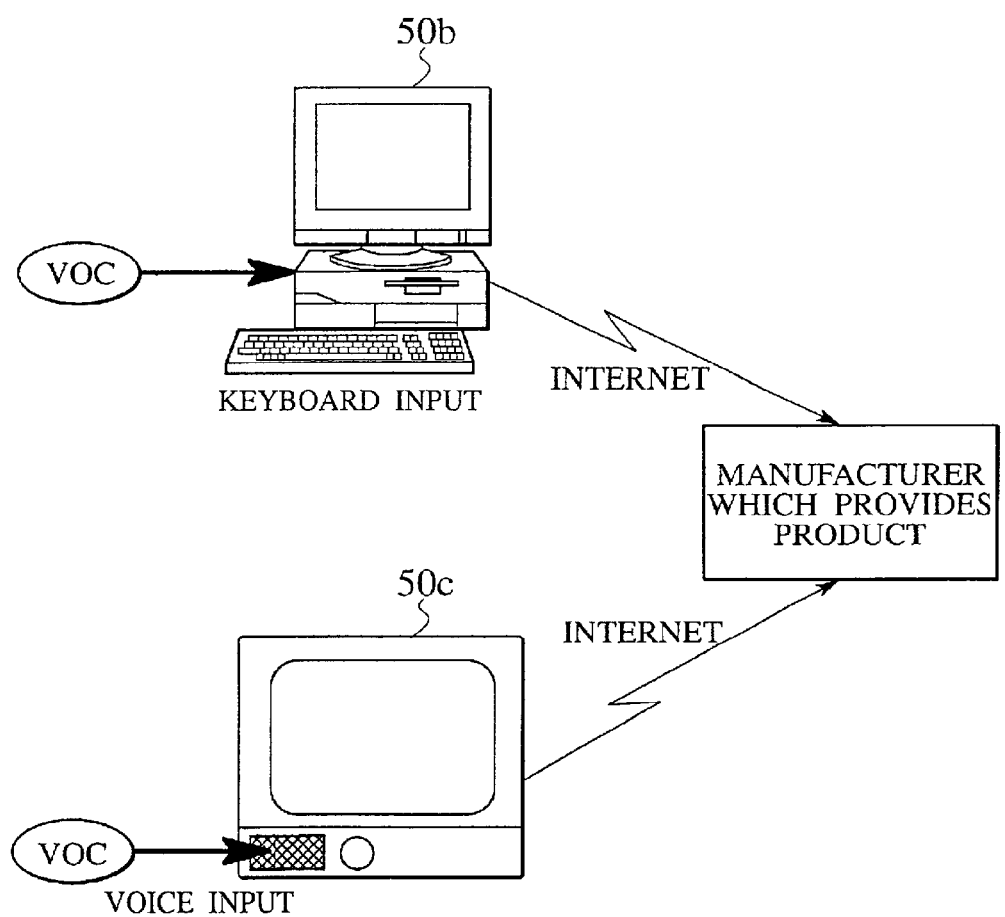
FIG. 5 is a drawing showing an example of an input/output unit and sending functionality which are provided in a particular product at the user's site.

Alternatively, where the product in question is a final product, if the product in question is a portable data terminal device or an electronic device having the ability to access the Internet, the VOC entry point may be provided, as shown at 50*c* in FIG. 5, at such an electronic device, e.g., television, telephone, or the like, allowing input of comments right as they arise during use of such an electronic product.

The VOCs so input are sent using transmission capability present in the product in question to a server owned, for example, by the provider of the product, and are stored in the VOC database 10*b*.

At the same time, information for uniquely identifying the user who is registering the VOC and information indicating various categories pertaining to the user (e.g., age bracket, family status, etc.) (hereinafter referred to as "user identification information"), and information indicating the type of product which corresponds to the VOC that was input and the circumstances under which the product is being used (hereinafter referred to as "situational information"), is collected either by input from the user himself or herself, or from previously registered information (step S105). The user identification information, situational information, and so forth so collected are sent to a server owned, for example, by the provider of the product, and are stored in the user information database 10*a*. This user identification information and situational information so stored are recorded in such a way as to be linked to VOCs stored in the VOC database lob.

Furthermore, at the manufacturer's site, user identification information for the user who carried out entry of the VOC has been registered as was stated above, making it possible to promote sales of the product while at the same time providing an incentive for entry of VOCs by thereafter returning some benefit or the other to that user when the VOC is used for release of a product or that user makes use of a product so released. Information for managing return of such a benefit may take the form, for example, of an increase in the value of a score, present within the user identification information of a user who inputs a VOC leading to a product release, in correspondence to the circumstances thereof in the event that the wants and needs of a user for a product as disclosed in the VOCs which are so collected are utilized in developing a product which is put on the market (step S107). Alternatively or in addition thereto, the value of such a score may be increased or further increased in the event that the user makes use of a product so released.

A product so released may be provided at no cost or at a discount, or the user may otherwise be given some form of special treatment, in correspondence to such a score which is maintained separately for each user and which is increased in value under circumstances such as those described above. As a result of such preferential treatment, a customer is motivated to input VOCs, and such a customer is made aware of the fact that his or her VOCs will not be ignored.

Moreover, the user VOC collection techniques described with reference to FIG. 3 may also be easily applied to questionnaire-type surveys, such as are mentioned below, to ascertain how important a user considers each of a number of desired qualities to be, how satisfied a user is with the products of each of a number of companies, how well-received a set of product concepts defined by the product concept evaluator 40 is likely to be by a user, and so forth.

Because the present invention makes it possible to cause the user to enter a VOC or the like right when and where the user forms some opinion during use of a product, it is possible to obtain responses that more closely represent true VOCs than is the case with responses obtained conventionally, where VOCs had been specially solicited from users through interviews, questionnaires, and the like.

Furthermore, in the present invention, a parts supplier, for example, would not ordinarily collect VOCs from an end-user, such VOCs typically being collected by the manufacturer of the assembled product (finished-product manufacturer) which is the customer of the parts supplier, and the foregoing technique allows VOCs to be collected in real time from a wide range of users, including the end-user.

Figure 4:
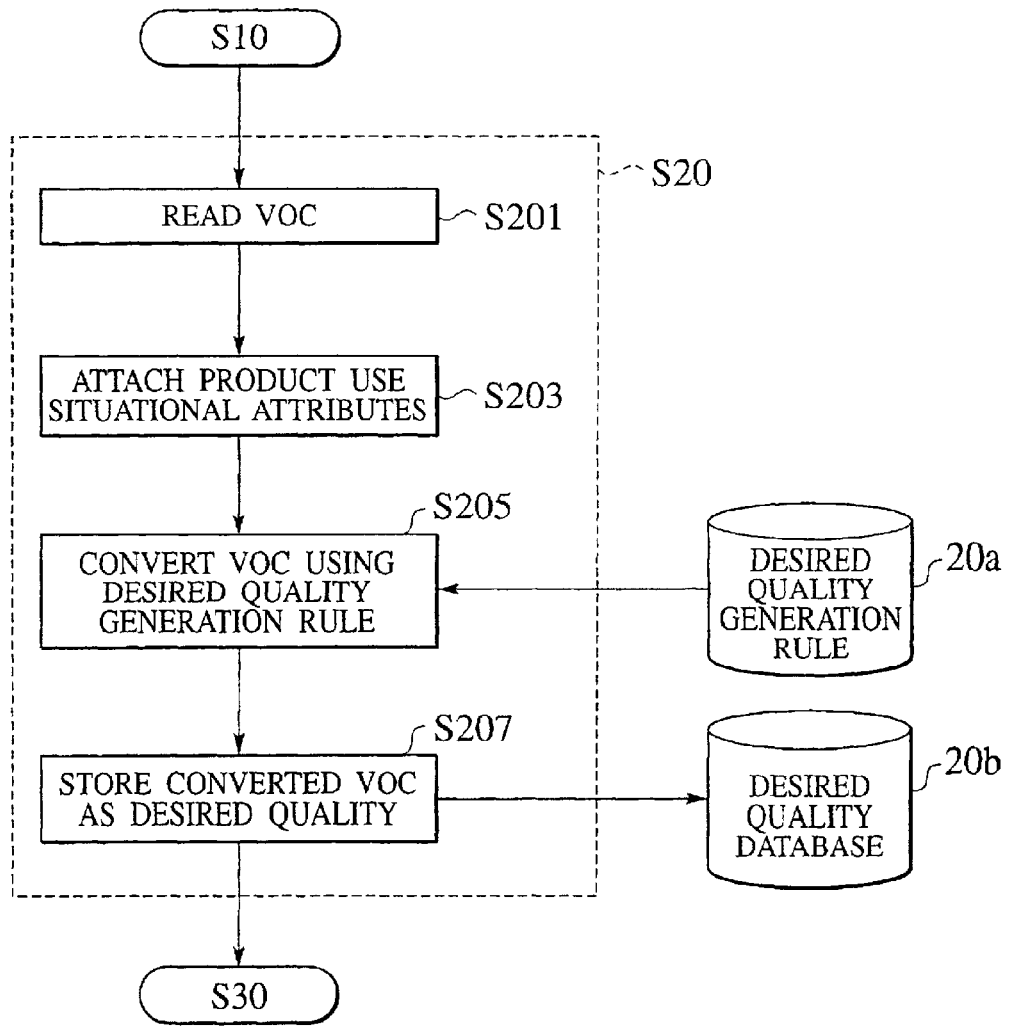
FIG. 4 is a flowchart showing various details in connection with the desired quality generation processing that takes place at the desired quality generation step S20 in FIG. 2.

FIG. 4 is a flowchart showing the detailed sequence of processing during the desired quality generation processing that is carried out by the desired quality generator 20.

With continued reference to FIG. 3 and with additional reference now to FIG. 4, VOCs stored in the VOC database 10b are input to the desired quality generator 20 (step S201). It has already been mentioned that the above-described situational information indicating the circumstances under which the product is being used is linked to the VOC as part of the user attribute information, and this situational information may be linked to the VOC at this time (step S203).

The desired quality generation rule 20a is then applied to the VOC, causing conversion thereof (step S205). Because in most cases VOCs are, as indicated above, composed in the context of the current specifications for a particular product, it is often impossible, from the literal content of the VOC as expressed by the user, to adequately grasp exactly what it is that the user would perceive to be a true benefit in that product. For this reason, a desired quality rule is applied to the VOC to extract therefrom items that the user would ultimately perceive to be benefits in the product in question.

This desired quality rule may, for example, comprise one or more of the following rules.

a. Rephrase as concise expression rather than narrative description.

b. Make sure that a single comment does not contain more than one want or need.

c. Make sure that each statement present within the VOC or a set of VOCs is independent from other such statements, and that there is no interdependency among statements.

d. Convert vague expressions to specific expressions possessing a consistent level of detail.

e. Express as true wants and needs in the language of the user to the fullest extent possible.

f. Rewrite as necessary so that all comments are in affirmative form.

g. Express in terms of effect on (benefit to) customer rather than as specifications or remedial action.

h. Convert statements of wishes or desires to statements of specific attributes (e.g., statements of the form "a product having the following features . . . " rather than "would you please . . . ").

i. Include specific reference to the product or feature in question.

j. Rephrase so as to obtain team understanding (consensus).

k. Restate in "subject+verb+object" form.

In addition, as further examples of such desired quality generation rules, any of the desired quality guidelines listed, for example, in "QFD (Quality Function Deployment) Guidebook: Principles of Quality Function Deployment and Applications Thereof" ("*QFD (Quality Function Deployment) Gaidobukku: Hinshitsu Kinou Tenkai no Genri to Sono Ouyou*" by Tadashi Ofuji, Michiteru Ono, and Kazushi Nagai; Japanese Standards Association; ISBN 4-542-50158-2) may be used.

Furthermore, during processing to convert such a VOC to a desired quality, application of the situational information which was created at step S203 to the VOC being converted makes it possible to infer, based on the circumstances under which the user is actually using the product in question, why the user would require the particular functionality which was described in the VOC. Based on this inference, it is possible to obtain a desired quality representing the true requirement of the user.

For example, taking the case where the product in question is a RISC chip which is used in a laser beam printer such as was described above, if the user enters the VOC "we would like a maximum operating frequency of 200 MHz for the RISC chip," we might infer from the circumstances under which the user is using this RISC chip (e.g., high-volume printing of documents) that the true quality required by the user (desired quality) for the product in question is "ability to print fonts (typefaces) at high speed."

Desired qualities obtained by converting VOCs in this fashion are stored in the desired quality database 20b separately for each product under consideration (step S207).

Figure 6:
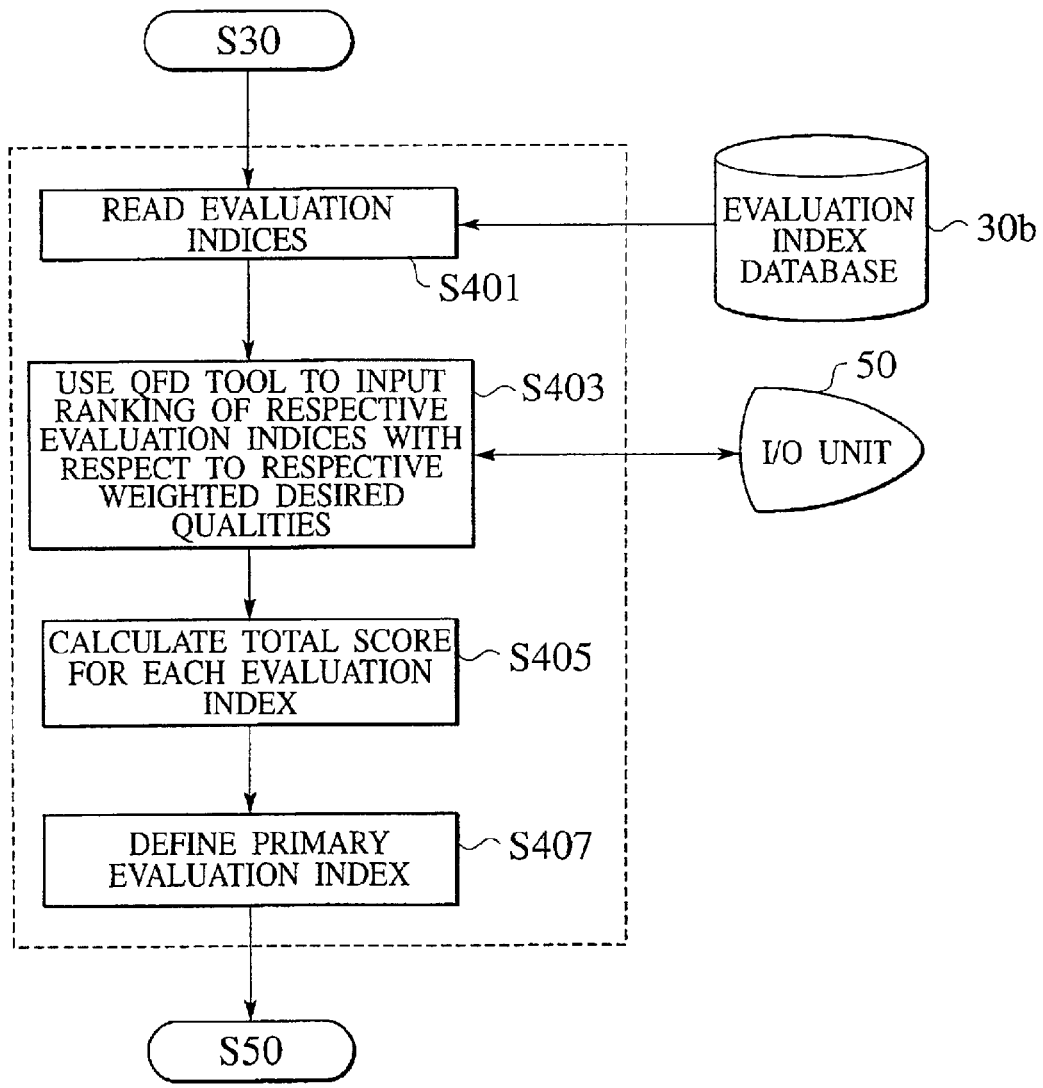
FIG. 6 is a flowchart showing various details in connection with the primary evaluation index definition processing that takes place at the primary evaluation index definition step S40 in FIG. 2.

FIG. 6 is a flowchart showing the detailed sequence of processing during the primary evaluation index definition processing that is carried out by the primary evaluation index definer 30.

Referring to FIG. 6, a number of evaluation indices are read from the evaluation index database 30b (step S401). The "evaluation index" referred to here is an index which admits of objective measurement and which serves as a measure for evaluating the degree to which the various desired qualities are achieved.

It is preferred that this evaluation index be a measure which is capable of being measured quantitatively. Taking a few specific examples, a five-step ranking system or other such objective scale would be preferred over subjective criteria such as taste or style, or taking another example, an index which is expressible in terms of actual numbers, such as average response time or the like, would be even more preferred.

These evaluation indices are chosen so as to satisfy criteria such as those listed below, and are generated beforehand for each product or each family of products and are stored in an evaluation index database 30b.

a. Capable of being measured.

b. Capable of being controlled at the product provider's site.

c. Permits prediction of the direction in which a parameter should be changed in order to increase customer satisfaction. (i.e., the smaller the value of the parameter the better, the larger the value of the parameter the better, etc.)

d. Permits proactive or preemptive strategies.

e. Independent of specific remedial action.

f. Is a practical measure.

Ranking indicating respective correlations between desired qualities generated by the desired quality generator 20 and evaluation indices so read is then input (step S403). Design staff may be made to enter this ranked input by way of the I/O unit 50. It is preferred that desired qualities being evaluated for such correlation have been weighted as a result of ranking by the user or the like (step S30 at FIG. 2). This ranked input may be carried out by way of the I/O unit 50 using a tool or the like running on a computer, where, for example, QFD methodology such as that described at the aforementioned "QFD Guidebook: Principles of Quality Function Deployment and Applications Thereof" has been implemented.

FIG. 7 is a drawing showing an example of an image which is displayed when such ranked input of respective evaluation indices against respective weighted desired qualities is carried out using a QFD tool in a case where a RISC chip for use in a laser beam printer is taken to be the product in question.

Referring to FIG. 7, extracted desired qualities (e.g., "software development is easy," "capable of high-speed image processing," etc.) are listed one item at a time, for example in separate rows, and for each such desired quality the importance thereof as evaluated by the user is indicated. Listed in the respective columns are evaluation indices (e.g., high-performance rating, initial defect rate, etc.) for the product in question. Each of the cells in the matrix formed by combination of respective weighted desired qualities and evaluation indices may be assigned a rank indicating the correlation therebetween, this rank being input after it is determined through brainstorming or another such technique.

Following completion of ranked input, the total weighted score for each evaluation index is calculated (step S405). At FIG. 7, this total score (raw score) is indicated, with the value of the normalized score indicating the weight of each evaluation index. An evaluation index having a large normalized score is defined as a primary evaluation index (step S407).

Describing this more specifically and taking the case where the product in question is a RISC chip used in a laser beam printer such as was described above, if the VOC from the user is, for example, "we would like a 64-bit RISC microprocessor that operates at 200 MHz," after applying the aforementioned desired quality rule 20a at the aforementioned desired quality generation processing and inferring from the situational information, we assume that the primary evaluation index "dots/sec" would be extracted from the desired quality "capable of high-speed image processing" (at FIG. 7, because a maximum score—107—is indicated for "dots/sec," this "dots/sec" represents the primary evaluation index in this example). "Dots/sec" indicates the speed at which dot position information is sent from the image processing controller of the RISC microprocessor to the laser engine.

In general, there are any number of product concepts which might be capable of achieving a particular desired quality or qualities, and in the present case as well, several alternative product concepts may be proposed for improving the desired quality "capable of printing fonts at high speed." For example, we might, adopt the specification requested in the VOC and (1) increase the operating frequency of the RISC chip to 200 MHz, or we might (2) employee a 16-bit RISC core microprocessor having an operating frequency of on the order of 40 MHz and instead carry out font printing processing using dedicated hardware, or we might adopt any of a number of other product concepts. Using the foregoing primary evaluation index "dots/sec" as a measure to evaluate such a number of product concepts, upon calculating "dots/sec" using an arbitrary simulation tool we might learn that the latter, i.e., product concept (2), allows us to minimize chip size and achieve a maximum value for "dots/sec." Accordingly, as will be described below, it is sufficient for our purposes to simply adopt the product concept for which the primary evaluation index "dots/sec" is a maximum.

FIG. 8 is a drawing showing the relationships existing among various functions associated with font printing processing in a laser beam printer.

One of the desired qualities that an end-user might have for a laser beam printer is that it be "capable of high-speed printing." An evaluation index for evaluating this particular desired quality would typically be PPM (Pages Per Minute). A laser beam printer manufacturer would therefore like to develop a product for which this PPM is high. The functional blocks which affect this PPM are, referring to FIG. 8, the laser engine 701 and the image processing controller 702.

Of these, desired qualities involving a need to improve the performance of the image processing controller 702—this being a RISC chip issue—would be passed to the manufacturer of the RISC chip. That is, the RISC chip manufacturer might be informed of desired qualities such as "capable of carrying out high-speed font printing processing," "capable of carrying out high-speed image data processing," and the like.

In the case where such a printer manufacturer is the customer, as shown in FIG. 7 the primary evaluation index—being the evaluation index displaying the highest positive correlation with respect to the weighted desired qualities of the user in question—will be the aforementioned "dots/sec." Now, this "dots/sec" represents the speed at which dot position information is sent from the image processing controller 702 to the laser engine 701. The RISC chip, inasmuch as it is used at the image processing controller 702, is strongly related to performance as expressed by this primary evaluation index "dots/sec." We can therefore see that it will be sufficient for our purposes to simply adopt the product concept for which this "dots/sec" is a maximum. On the other hand, if the primary evaluation index were, for example, "initial defect rate," it would be desirable to adopt the product concept for which this "initial defect rate" is a minimum.

Figure 9:
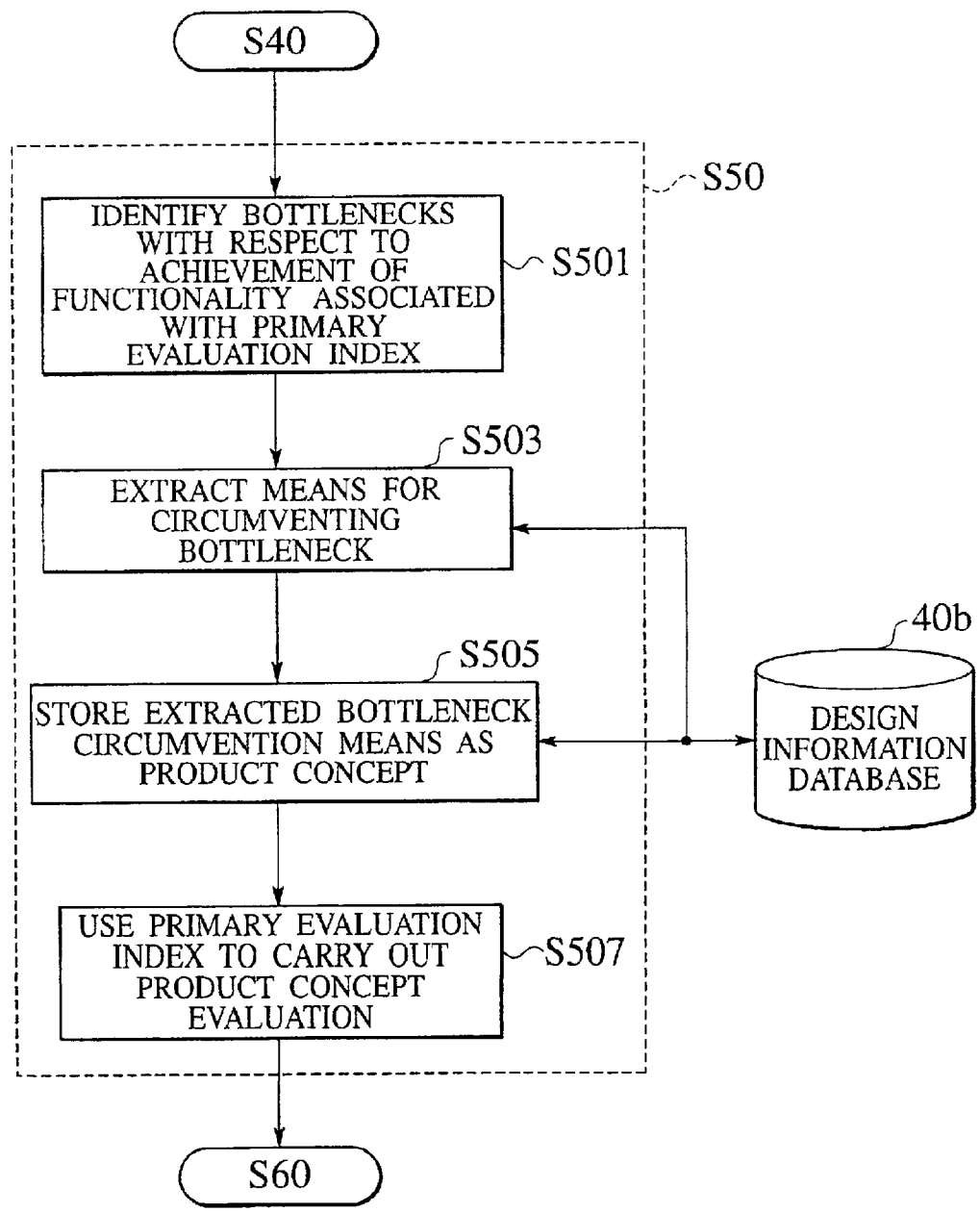
FIG. 9 is a flowchart showing various details in connection with the product concept evaluation processing that takes place at the product concept evaluation step S50 in FIG. 2.

FIG. 9 is a flowchart showing the detailed sequence of processing during the product concept evaluation processing that is carried out by the product concept evaluator 40.

Referring to FIG. 9, any items likely to represent a bottleneck with respect to achievement of the functionality associated with the primary evaluation index as defined by the primary evaluation index definer 30 are first identified (step S501). For example, if we consider the case where we are trying to improve the aforementioned primary evaluation index "dots/sec," in the event that font printing processing is carried out through software in current product, increasing the operating frequency of the RISC chip will allow us to increase "dots/sec" to a certain extent. However, having increased the operating frequency by a certain amount, we next find that the speed of the data bus represents a bottleneck.

Furthermore, a means for circumventing this bottleneck is extracted (step S503). For example, if the volume of data traffic on the data bus is responsible for the bottleneck, any of the following means might be considered for alleviation thereof.

a. Increase operating frequency
b. Increase the bandwidth of the data bus
c. Improve the data transfer rate Furthermore, a product concept or concepts capable of implementing one or more of these bottleneck solution means is or are generated.

At this time, a variety of different product concepts may be generated by, for example, approaching the problem of increasing the aforementioned primary evaluation index "dots/sec" not only through software solutions such as are implemented in current product, but also through combined application of software and hardware strategies in the context of any number of proposals that tradeoff the relative importance of software vs. hardware at a variety of levels.

The product concept or concepts so extracted as being capable of circumventing the bottleneck or bottlenecks are appended to the design information database 40b as new design items (step S505). The shared product concepts stored in the design information database 40b may be referenced during any subsequent product concept generation session, or may be modified and replaced with updated versions thereof as necessary.

Furthermore, a plurality of product concepts so generated may be evaluated from the standpoint, for example, of ability to improve the aforementioned primary evaluation index "dots/sec" (step S507).

Figure 10A:
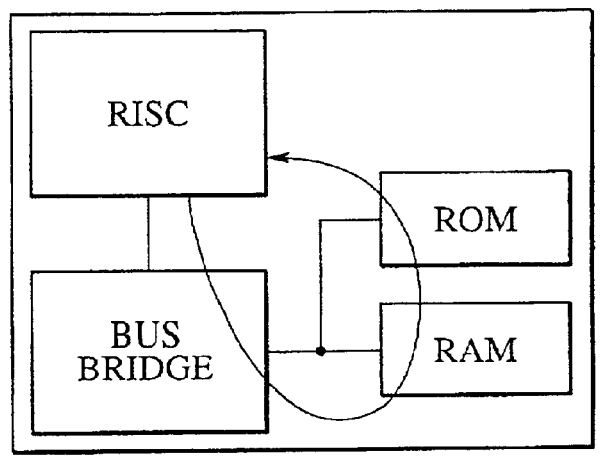
FIG. 10 is a drawing showing a plurality of design concepts that may be evaluated using the present primary evaluation index or indices.
Figure 10B:
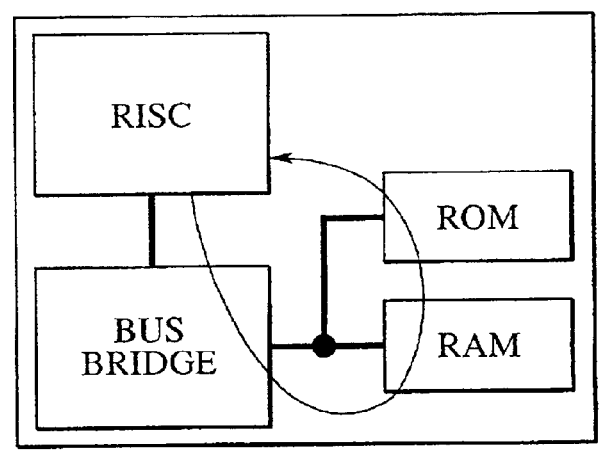
Figure 10C:
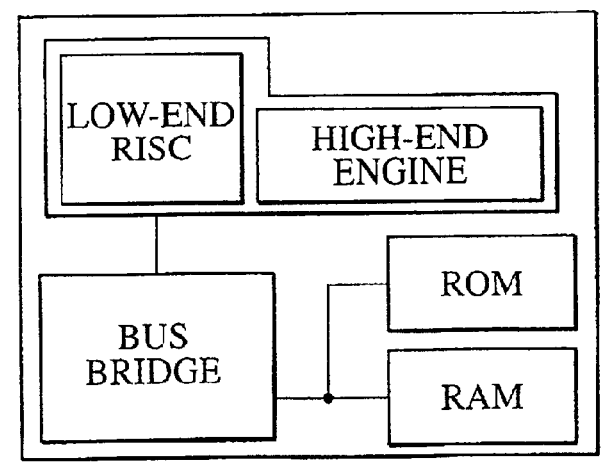

For example, with combined reference to FIGS. 9 and 10, at the aforementioned step S505, we might evaluate a proposal to (1) increase the bandwidth of the data bus (FIG. 10(b)) vs. a proposal to (2) reduce data bus traffic by manufacturing dedicated hardware for font processing and reducing the load on the RISC chip (FIG. 10(c)). In practice, when font processing is executed in software, this constitutes on the order of 70 percent of the RISC chip workload, so elimination of such font processing would represent a significant reduction in the load on the RISC chip. By so doing, it is possible to make do with a low-end 40 MHz 16-bit RISC chip instead of a high-end 200 MHz 64-bit RISC chip.

Comparing these two product concepts, because proposal (1) involves increasing bus bandwidth, it has the disadvantage of increased chip size. On the other hand, whereas proposal (2) requires incorporation of new hardware as well as the fact that we must get the customer, the laser beam printer manufacturer, to buy off on a new laser beam printer design philosophy, chip size is reduced. If the parts supplier responsible for supplying the RISC chip already possesses hardware technology for implementing font processing, it will be possible to achieve the product concept at proposal (2) through application of existing technology.

Using a generally known cost-benefit analysis method or the like to validate the product concept at proposal (2), which we are inclined to accept, we find not only that this will permit significant improvement in the cost vs. benefit situation but it will also permit reduction in overall cost.

Moreover, if we are interested in formulating proposals for long-term product planning for a particular product, we may, for example, select from among product concepts such as were generated above to respectively define product concepts suitable for adoption in products to be released in the next business cycle and product concepts suitable for adoption in strategic future-generation products (long-term-strategy products).

The first embodiment permits attainment of the following benefits.

An index which best fulfills the desired qualities required by the user is selected as a primary evaluation index, which is a quantitative measure for evaluation of product concepts. As a result, in selecting a concept or concepts for product design one need only adopt the concept or concepts for which this evaluation index is a maximum (or a minimum), allowing the voice of the user to be accurately captured and refined, permitting critical features (i.e., a domain) to be targeted so that a product design concept can be selected from the outset from the many possible variations on product specifications, and making it possible to quickly and easily obtain a product concept not constrained by current product specifications and possessing a high number of degrees of freedom.

Because the product design concept or concepts so selected is or are the product design concept or concepts which most satisfies or satisfy the wants and needs of the user, it is possible to get to market quickly and cheaply with a highly competitive product.

Furthermore, because the VOCs of the user with respect to the product in question are collected at the time and place when and where the user is using that product, it is possible to accurately collect the true wants and needs of the user with respect to the product in real time.

Second Embodiment

Below, with reference to FIGS. 11 through 20, we give a detailed description, focusing only on those areas which are different from the first embodiment, of a product design process, a product design apparatus, and a computer-readable recording medium for storing a product design program which are respectively associated with a second embodiment of the present invention. Furthermore, the configuration of the product design apparatus associated with the second embodiment is similar to the configuration of the product design apparatus associated with the first embodiment shown in FIG. 1. In the descriptions that follow, elements similar to those present in the first embodiment are given the same reference numerals as were used there and repetitive description of those elements is omitted here in the interest of brevity.

One aspect of the second embodiment is a product design method which is similar to the method associated with the first embodiment but which is particularly suited to the situation where the product in question already enjoys a reasonably large share in a relatively mature market, as it provides the ability to obtain evaluation indices for differentiating the product in question from products offered by competitors and to use these differentiated evaluation indices to obtain differentiated product concepts.

FIG. 11 is a drawing a showing the relationship between an LSI for TV (television) use and a TV system incorporating this LSI, this being an example of a situation where the product in question already enjoys a reasonably large share in a relatively mature market. Because the market is mature, product prices are already quite low, and there is a limit to the extent to which one can prevail over one's competitors on the basis of price competition.

In the case of this particular product, while it is necessary that the parts supplier offer products having different specifications to accommodate each of its different customers (TV manufacturers), the parts supplier would like to consolidate as many of these specifications as possible into a single LSI and to keep the number of variants to a minimum. Below, we describe product concept definition for a product in which the two chips enclosed within the broken line in FIG. 11 (a signal processing LSI and a microprocessor) are combined in a single package. Because there are many different models of each of the two chips which are packaged together (the signal processing LSI and the microprocessor), we can understand that there will be a huge number of possible combinations therebetween. For this reason, with this particular product, a major question will be to what extent it is possible to extract a product concept from the VOCs of the users, and how well that product concept will reflect those VOCs.

FIG. 12 is a flowchart showing the sequence of processing in a product design process associated with a second embodiment of the present invention.

Referring to FIG. 12, because the processing occurring during VOC collection (step S10), desired quality generation (step S20), and desired quality prioritization (step S30) is similar to that described with reference to the first embodiment, description thereof is omitted here.

One or more of the evaluation indices previously stored in the evaluation index database 30*b* is defined as a primary evaluation index or indices based on values indicating correlation with respect to desired qualities for which weighting has been carried out using the results of questionnaire surveys or the like completed by the user (S40*b*).

FIG. 13 is a flowchart showing the detailed sequence of processing during the primary evaluation index definition processing that is carried out in the second embodiment at step S40*b*.

Referring to FIG. 13, a number of evaluation indices are read from the evaluation index database 30*b* (step S401*b*). For each of the evaluation indices so read therefrom, a numerical ranking indicating correlation with respect to the desired qualities which were weighted at step S30 is input into a matrix table or the like using a QFD tool displayed by way of the I/O unit 50 (step S403*b*). For each of the respective evaluation indices, these ranked values are totaled to obtain a first score therefor (step S405). Furthermore, with additional momentary reference to FIG. 5, the user is made to enter, by way of I/O units 50*b* and 50*c*, a numerical value or values indicating, for example, the relative satisfaction of the user with respect to the present manufacturer's product as compared with several competitors, and this relative ranking is used to calculate a difference, or spread, between competitors as compared with the present manufacturer (step S407*b*). This spread is applied to the first score to calculate a second score (step S409*b*). The evaluation index or indices for which this second score is a maximum (or minimum) is defined as the primary evaluation index or indices (step S411*b*).

FIG. 14 is a drawing showing an example of the content of an output screen which is displayed by the I/O unit 50 using the aforementioned QFD tool during the course of determination of a primary evaluation index. Weights of respective evaluation indices are calculated by evaluating the correlation between the evaluation indices and the desired qualities which were weighted by the user. However, especially with a mature market, merely linking desired qualities to the various evaluation indices will result in a situation where a large number of the evaluation indices will be calculated to have weights similar in magnitude to those of other evaluation indices, making it difficult to identify a suitable primary evaluation index for quantitative evaluation of product concepts.

Figure 15:
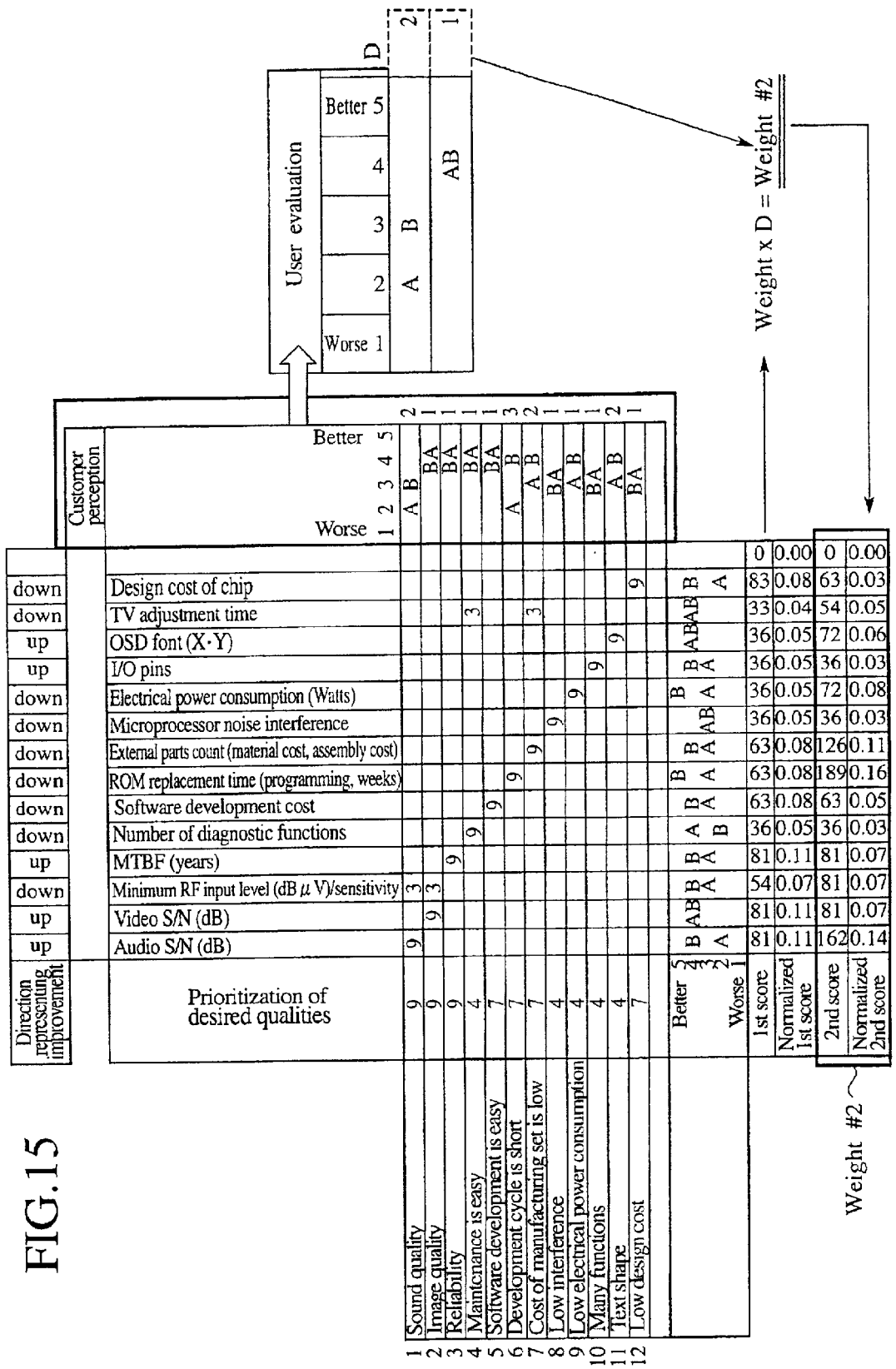
FIG. 15 is a drawing to assist in describing calculation of weights for respective evaluation indices wherein benchmark indices are taken into consideration, such calculation being carried out by a primary evaluation index definer 30 associated with a second embodiment of the present invention.

FIG. 15 is a drawing showing an example of a procedure for calculation of a primary evaluation index in the second embodiment. Referring to FIG. 15, in the second embodiment, user evaluations of respective desired qualities or respective evaluation indices or both may be entered for various leading manufacturers. For example, where user evaluations are entered with respect to desired qualities, the user's evaluation of a first desired quality item (here, sound quality) might be 2 for Company A, and 3 for Company B, as shown in the example at FIG. 15. Furthermore, evaluation of a second desired quality item (here, image quality) might be 4 for both Company A and Company B, as shown in FIG. 15. Such evaluation of comparisons (benchmarks) with respect to other companies may be obtained by soliciting input from the user by way of the I/O units 50*b* and 50*c* in accordance with a procedure similar to that used for VOC collection processing at the first embodiment.

Using such evaluations of or comparisons with other companies, it is possible to evaluate how the present company fares versus other companies with respect to the degree to which the true wants and needs of the user are satisfied, and it is also possible to assess the spread in the competition therefrom. In more specific terms, this differential may be represented by a numerical value, and weights (customer weights) associated with respective desired qualities may be respectively multiplied by this numerical value to obtain new weights which are used to recalculate respective evaluation indices. For example, looking at the first desired quality item (here, sound quality) in FIG. 15, because the evaluations for Company A and Company B occupy a spread D of 2 (i.e., user evaluations for those companies differ across a range of 2 units on our scale), we use this value as a factor by which we multiply respective evaluation indices, so that, for example, the evaluation index "audio S/N ratio" is given a new weight reflecting this factor, making it the even more heavily weighted value 0.14. Use of weighted values reflecting such a spread D in the evaluations of competitors allows us to draw out differences in the importance of the various evaluation indices. Because the user is generally faced with a number of alternatives (i.e., there are a plurality of competing products), the wants and needs of the user with respect to the product in question can be more easily drawn out when expressed as relative values reflecting the competitive situation rather than as absolute values. By using evaluation indices calculated in this fashion, it is possible to obtain a product concept that will better reflect the true wants and needs of the user against the backdrop of the competition.

Returning now to FIG. 12, the primary evaluation index defined at step S40*b* is used to evaluate product concepts (step S50).

In the second embodiment, a product concept is selected either at the time that product concepts are evaluated or at a later step (step S55), to be described below.

Each product concept, which represents a means of achieving the objectives indicated by the evaluation indices, presents a number of technological possibilities. That is, each broad product design concept will in general embrace or suggest any number of related subconcepts (technological alternatives), and this is also true in the particular case of our example where two chips are being assembled into a single LSI. Generally, with most product concepts, it frequently happens that there is a tradeoff such that improvement of performance with respect to a primary evaluation index causes performance with respect to one or more of the other evaluation indices to be lowered. In defining one or more primary evaluation indices at step S40*b*, the product concept evaluator 40 associated with the second embodiment selects a technological concept that will improve overall performance.

Figure 16:
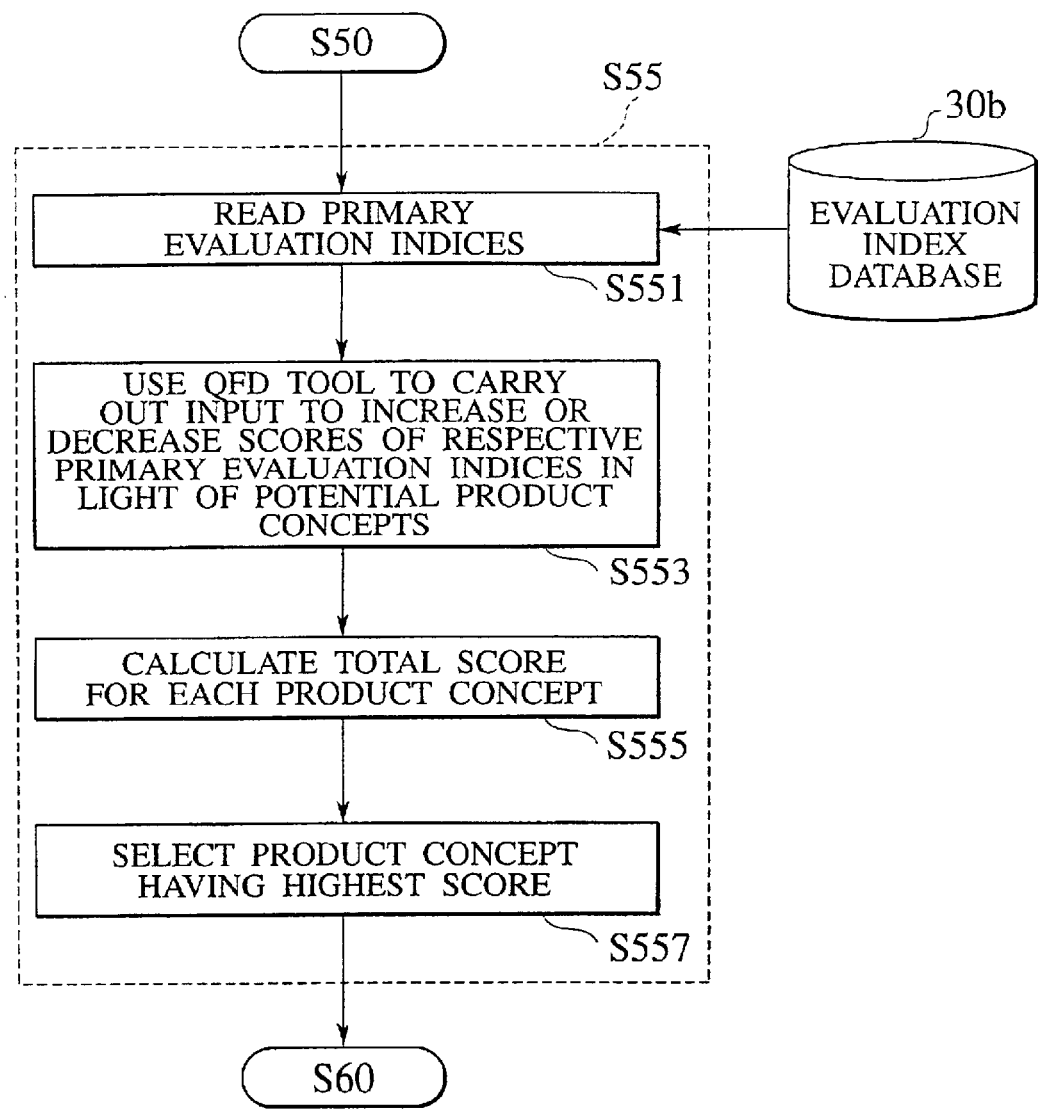
FIG. 16 is a flowchart showing various details in connection with the product concept selection processing that takes place at the product concept selection step S55 in FIG. 12.

FIG. 16 is a flowchart showing various details in connection with processing occurring during product concept selection processing (step S55) associated with the second embodiment.

Referring to FIG. 16, one or more primary evaluation indices defined at step S50 are first read from the evaluation index database 30*b* (step S551).

Furthermore, input is carried out to increase or decrease scores of respective evaluation indices for candidate product concepts after considering technological issues, time constraints, and so forth applicable to the product in question (step S553).

Figure 17:
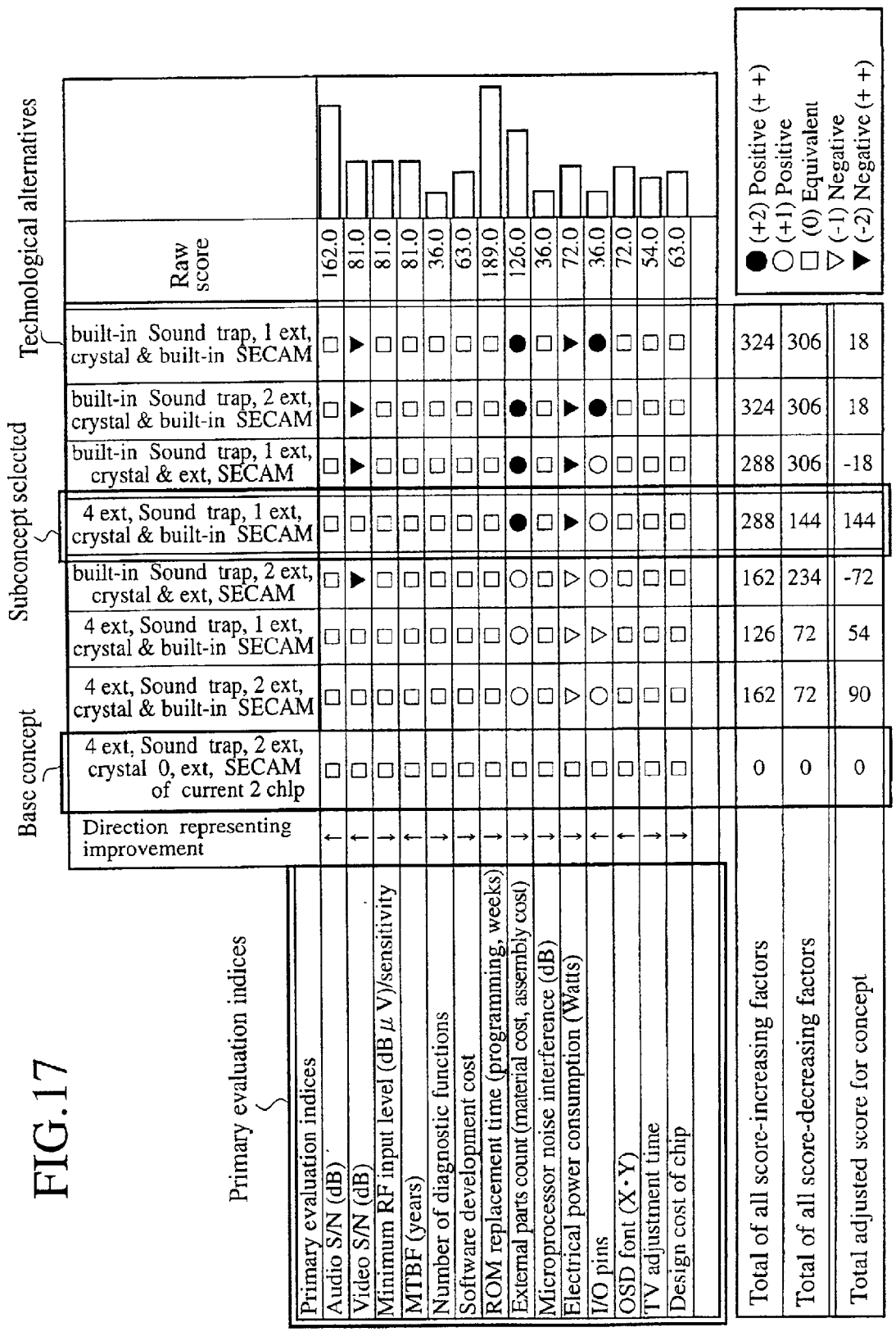
FIG. 17 is a drawing showing an example of the content of an input/output screen for the evaluation of respective product concepts occurring during the product concept selection processing that is carried out at the product concept selection step S55 in FIG. 12.

FIG. 17 shows an example of the content of an input/output screen of a tool running on a computer, input and output being managed by way of the I/O unit 50, the primary evaluation indices so read being listed one at a time, for example in separate rows, and the base concept and a number of subconcepts ("subconcepts" here not necessarily indication subordination) representing various technological alternatives with respect thereto being listed one at a time, for example in separate columns, in a matrix table.

Contraposed against the evaluation indices, there are, shown listed in separate columns in the example at FIG. 17, a base concept which was identified as a result of evaluation at step S50 and a number of subconcepts ("subconcepts" here not necessarily indication subordination) which are capable of being adopted and which represent technological alternatives with respect to this base concept.

Using this matrix, directional values are entered to indicate quantitatively (a five-step scale being used at FIG. 17) whether each of the evaluation indices is improved or worsened as a result of adoption of each the respective subconcepts. For each candidate concept, the scores of the evaluation indices after adjustment (here, multiplication) by the directional values so entered are summed to calculate a total score for each concept (step S555). In the case of the matrix shown at FIG. 17, we can readily understand that the concept having a total adjusted score of 144, this concept having the highest score and being shown enclosed within a solid-lined box in the drawing, represents the optimal product concept. The concept having the highest total adjusted score is selected as the concept for product (step S557).

Returning now to FIG. 16, product specifications are defined based on the product concept selected at step S557 (step S60).

Figure 18A:
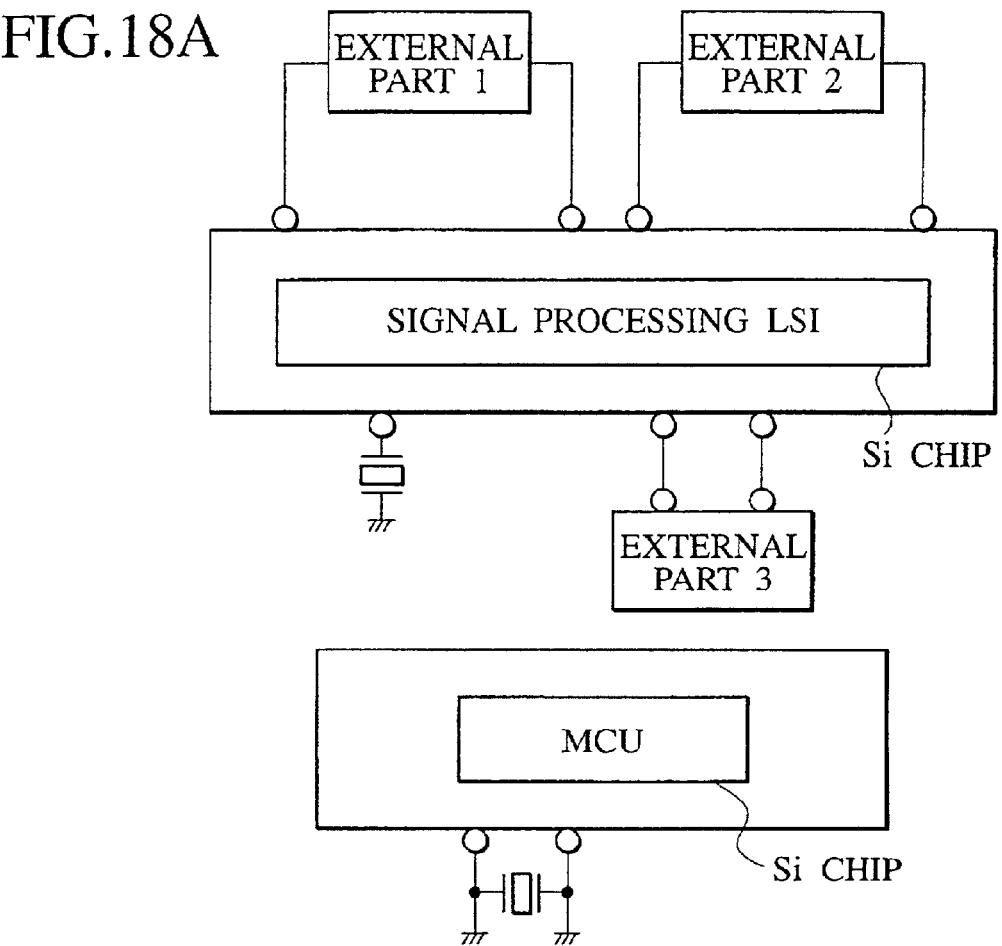
FIG. 18 is a block diagram showing the functional configuration of a product concept selected at the second embodiment.
Figure 18B:
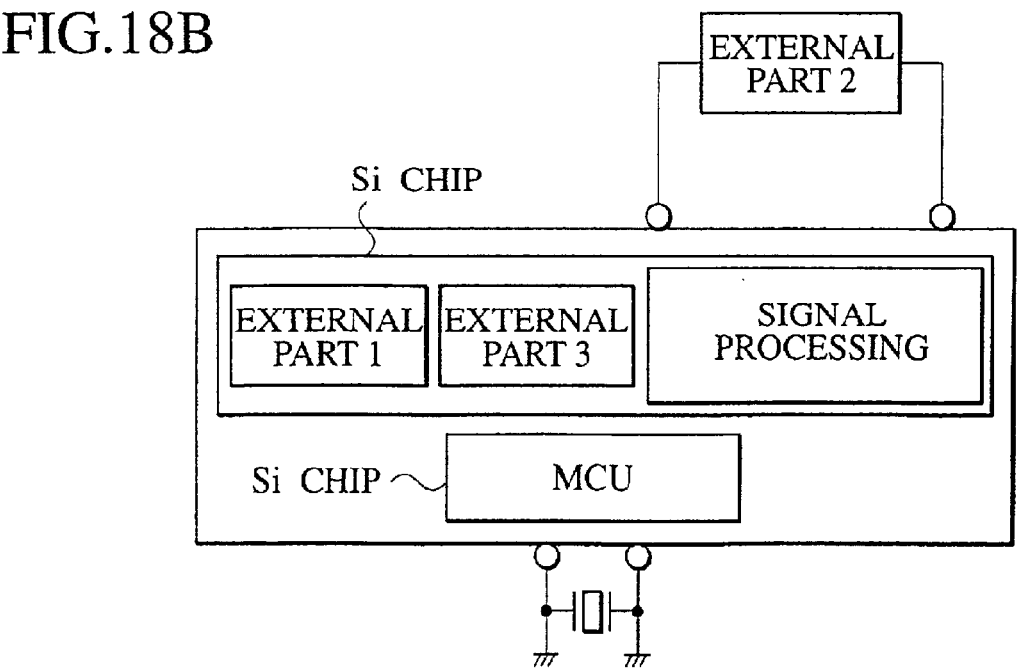

FIG. 18 is an example of the results of the product concept selection processing performed at step S55 in FIG. 12. Here, design efforts have resulted in combination of two chips, a microprocessor chip and a signal processing LSI chip (FIG. 18(a)) into a single package in a product (two-in-one product) (FIG. 18(b)) having specifications producing the highest user satisfaction and the lowest manufacturing cost, including costs associated with the external parts count as well as the assembly.

Figure 19:
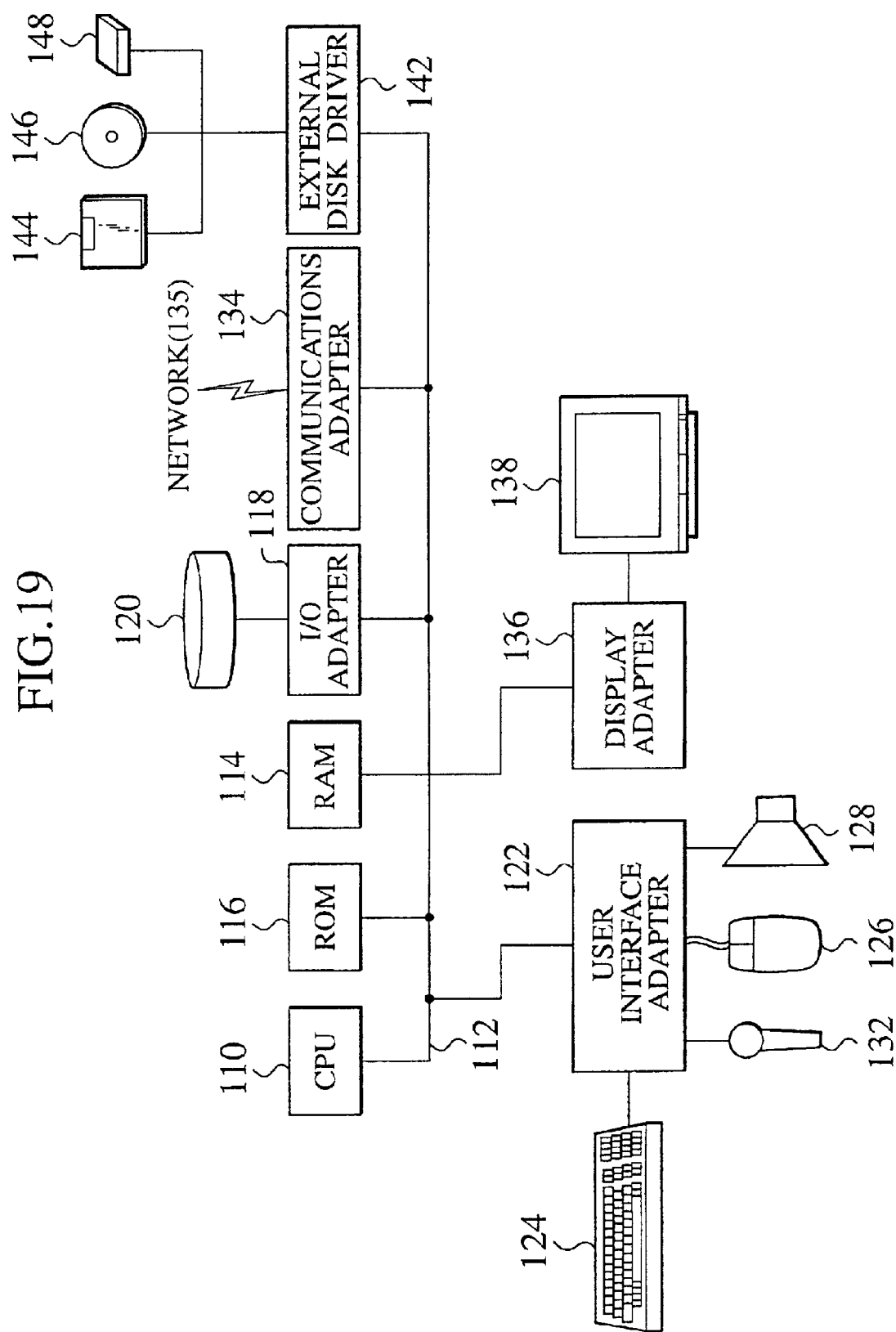
FIG. 19 is a block diagram showing an example of the hardware configuration of a product design apparatus and a product design system associated with the several embodiments of the present invention.

FIG. 19 is a block diagram showing an example of the hardware configuration of a product design apparatus and a product design system associated with the several embodiments of the present invention.

A product design apparatus 100 associated with the several embodiments of the present invention may, for example, have a configuration such as that shown in FIG. 19. That is, a product design apparatus 100 associated with the several embodiments of the present invention may be constructed such that the various product design processing elements are implemented in the context of one or more computer systems.

Referring to FIG. 19, such a computer system or systems may comprise a microprocessor or other such central processing unit 110 and a large number of other devices which are mutually connected by way of a system bus 112. Such a computer system or systems 100 may be equipped, for example, with random access memory 114; read-only memory 116; an I/O adapter 118 which connects a hard disk device 120 or other such peripheral device or devices to a system bus 112; a user interface adapter 122 which connects a keyboard 124, a mouse 126, a speaker 128, a microphone 132, a touch screen (not shown), or other such user interface devices to the system bus 112; a communications adapter 134 which connects the computer system or systems to a communications network; a display adapter 136 which connects a display apparatus 138 to the system bus 112; and an external disk driver 142 which respectively drives a floppy disk 114, an optical disk 146, and various memory cards 148.

By storing a product design program or programs for executing the various product design processing functions of the present invention on any of a variety of computer-readable recording media typified by the floppy disk 144, the optical disk 146, the various memory cards 148, and the like, and by carrying out prescribed operations for retrieval of that program or programs from such recording medium or media by way of an external disk driver 142 or the like, it is possible to install on the computer system or systems the product design program or programs for executing the various product design processing functions of the present invention stored on such medium or media. The product design processing of the present invention can be carried out, for example, by loading such program or programs into random access memory 114 and causing the central processing unit 110 to carry out execution thereof.

Figure 20:
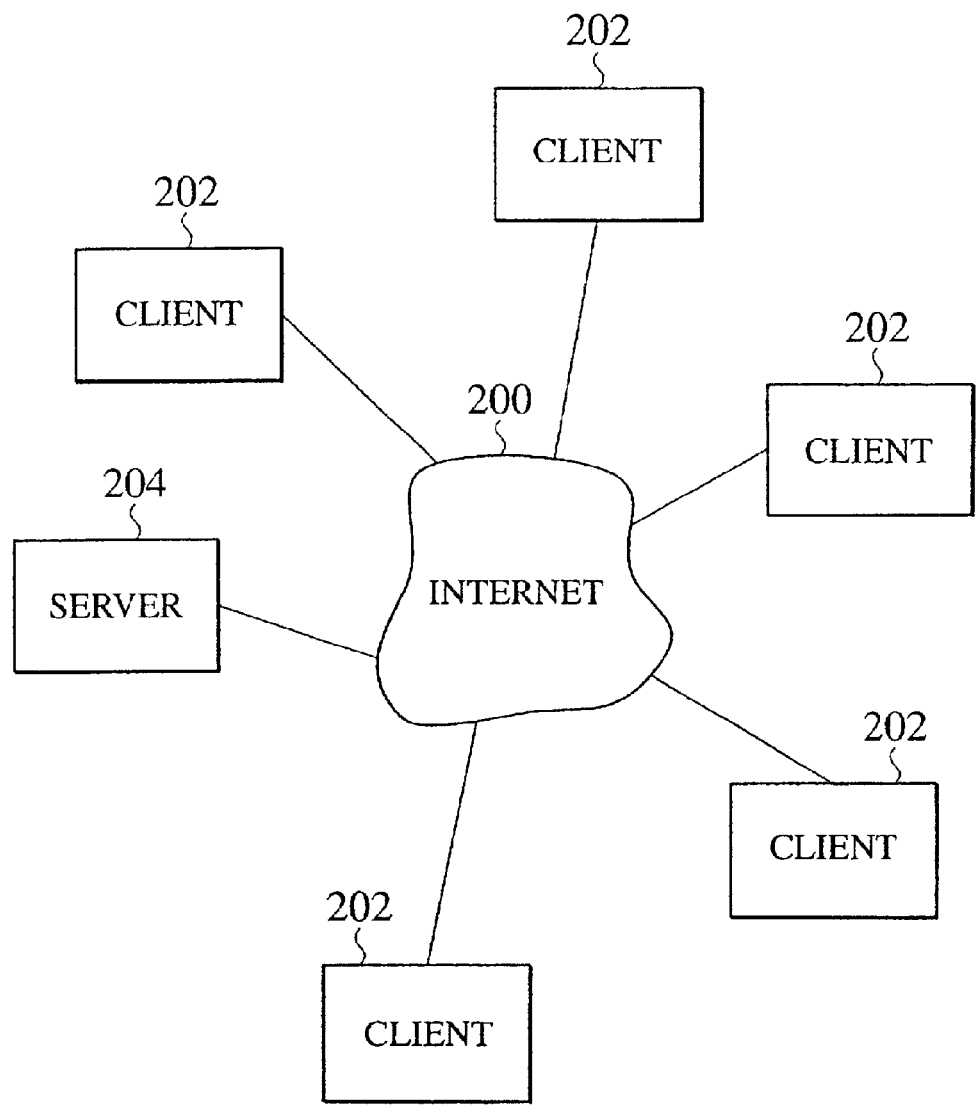
FIG. 20 is a drawing showing an example of a network configuration which may be employed by a product design apparatus or a product design system associated with the several embodiments of the present invention.

FIG. 20 shows an example of an embodiment of the present invention carried out in the context of a network such as the Internet. Referring to FIG. 20, a product design system associated with the present invention comprises a plurality of client machines 202 connected to a server 204 by way of a network 200. A product design apparatus 100 is arranged at the server 204, and I/O units 50b and 50c are arranged at each of the clients 202, and by implementing the product design system associated with the present invention over the network it is possible to carry out the present invention on a large scale.

In addition to the benefits provided by the first embodiment, the second embodiment permits the following benefits to be obtained.

The second embodiment is particularly suited to the situation where the product in question already enjoys a reasonably large share in a relatively mature market, as it provides the ability to calculate weighted evaluation index scores using differences, or spreads, in the evaluations of respective manufacturers entered by the user. As a result, this makes it possible to obtain evaluation indices for differentiating the product in question from products offered by competitors, and these differentiated evaluation indices can be used to obtain differentiated product concepts.

Furthermore, evaluation can be carried out as to whether respective evaluation indices would be improved or worsened (directional evaluation) as a result of adoption of each of a plurality of subconcepts representing specific technological alternatives with respect to a base concept defined using a primary evaluation index, and an optimal subconcept can be selected through appropriate totaling of scores adjusted based on such directional evaluation. As a result, particularly in a situation such as that of the aforementioned two-in-one product, or where there are a large number of potential subconcepts capable of achieving a base concept that has been defined, it is possible to develop a product which reflects the concept which allows the greatest quantitative level of user satisfaction to be obtained.

Whereas the present invention has been described above in terms of a number of possible embodiments, these embodiments are not intended to limit the scope of the invention, as the present invention may embrace a wide variety of possible embodiments other than those specifically described above.

In summary, the embodiments associated with the present invention respectively allow the voice of the user to be accurately captured and refined, permitting a domain to be targeted from the outset from the many possible variations on product specifications, and making it possible to quickly and easily obtain through quantitative evaluation a product design concept not constrained by current product specifications and possessing a high number of degrees of freedom. Accordingly, the present invention makes it possible to quickly and cheaply put on the market a product that is highly competitive.

Additional advantages and modifications will readily occur to those skilled in the art. Therefore, the invention in its broader aspects is not limited to the specific details and representative embodiments shown and described herein. Accordingly, various medications may be made without departing from the spirit or scope of the general inventive concept as defined by the appended claims and their equivalents.

What is claimed is:

1. A process for designing a product automatically in accordance with a desired product design concept for a product under consideration, said process comprising:
   analyzing wants and needs information which has been input with respect to the product under consideration;
   based on the aforesaid analyzed wants and needs information, carrying out weighting with respect to evaluation indices which are quantitative measures of the degree to which a user is likely to perceive a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum, wherein said analysis step converts, as a result of application of a conversion rule previously stored in a storage device, said wants and needs information to desired quality information reflecting usage circumstances under which the user wishes to use the product under consideration; and said desired quality information is used in said primary evaluation index selecting a step to carry out weighting with respect to the aforesaid evaluation index.

2. The process according to claim 1 wherein:

in said primary evaluation index selection, weighting of the aforesaid evaluation index is carried out by calculating, for each evaluation index, score indicating correlation between said desired quality information obtained by conversion and said evaluation index.

3. The process according to claim 2 further comprising:

displaying a matrix table formed by combination of said desired quality information and said evaluation indices; and prompting user to input ranked information with respect to said matrix table.

4. The process according to claim 1 further comprising:

carrying out weighting of said desired quality information obtained by conversion at said analysis step;

the weighted desired quality information being used at said primary evaluation index selection step to carry out weighting with respect to the aforesaid evaluation index.

5. A process according to claim 4 wherein:

in said weighting step, weighting is carried out by calculation based on voting input by the user for said desired quality information obtained by conversion.

6. A process for designing a product automatically in accordance with a desired product design concept for a product under consideration, said process comprising;

analyzing wants and needs information which has been input with respect to the product under consideration;

based on the aforesaid analyzed wants and needs information, carrying out weighting with respect to evaluation indices which are quantitative measures of the degree to which a user is likely to perceive a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum, wherein said analysis step converts said wants and needs information to desired quality information as a result of application of situational information reflecting circumstances under which the product under consideration is to be used; and said desired quality information is used in said primary evaluation index selection step to carry out weighting with respect to the aforesaid evaluation index.

7. A process for designing a product automatically in accordance with a desired product design concept for a product under consideration, said process comprising:

prompting a user to input said wants and needs information, wherein said prompting step comprises:

storing identification information identifying the user who input the aforesaid wants and needs information in linked fashion with the aforesaid wants and needs information; and increasing the value of a point for providing positive feedback in responsive to input of said wants and needs information in connection with a product that is put on market for a user identified based on said identification information;

analyzing the wants and needs information which has been input with respect to the product under consideration;

based on the aforesaid analyzed wants and needs information, carrying out weighting with respect to evaluation indices which are quantitative measures of the degree to which the user is likely to perceive a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum.

8. A process for designing a product automatically in accordance with a desired product design concept for a product under consideration, said process comprising:

analyzing wants and needs information which has been input with respect to the product under consideration;

based on the aforesaid analyzed wants and needs information, carrying out weighting with respect to evaluation indices which are quantitative measures of the degree to which a user is likely to perceive a benefit latent in the product under consideration and inherent in the aforesaid wants and needs information to have been achieved, and selecting at least one index among a plurality a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum, wherein said product design concept definition step comprises:

calculating a first score by summing, for each evaluation index, values indicating respective degrees of correlation between the aforesaid evaluation indices which have been previously stored and desired quality information obtained by conversion;

calculating a difference in levels of satisfaction of the user with respect to a provider of the product under consideration and another provider which provides a product equivalent thereto as input by the user for each evaluation index; and calculating a weighted second score based on the aforesaid calculated values indicating differences in levels of satisfaction.

9. A process for designing a product automatically in accordance with a desired product design concept for a product under consideration, said process comprising:

analyzing wants and needs information which has been input with respect to the product under consideration;

based on the aforesaid analyzed wants and needs information carrying out weighting with respect to evaluation indices which are quantitative measures of the degree to which a user is likely to perceive a benefit latent in the product under consideration and inherent in the aforesaid wants and needs information to have been achieved, and selecting at least one index among a plurality of such weighted evaluation indices as a primary evaluation index; and defining at least one product design concept for which the primary evaluation index selected at said primary evaluation index selecting step is a maximum or minimum, wherein said product concept definition step comprises:

defining an interfering factor which interferes with achievement of functionality associated with the evaluation index selected at said primary evaluation index selection step;

obtaining means for circumventing said interfering factor by searching a design information database in which design concepts from past product designs are stored; and storing said interfering factor circumvention means as a design concept for the product under consideration.

10. An apparatus for designing a product, using a computer in accordance with a desired product design concept for a product under consideration, said apparatus comprising:

an analyzer that analyzes wants and needs information which has been input with respect to the product under consideration;

a primary evaluation index definer that based on said analyzed wants and needs information, carries out weighting with respect to evaluation indices which have been previously stored in a storage device and which are quantitative measures of the degree to which a user is likely to perceive a benefit latent in the product under consideration and inherent in said wants and needs information to have been achieved, and that selects at least one index among a plurality of such weighted evaluation indices as a primary evaluation index; and a product concept evaluator that defines at least one product design concept for which the primary evaluation index selected by said primary evaluation index definer is a maximum or minimum, wherein said analyzer, by applying a conversion rule previously stored in a storage device, converts said wants and needs information to desired quality information reflecting usage circumstances under which the user wishes to use the product; and said primary evaluation index definer uses said desired quality information to carry out weighting with respect to said evaluation index.

11. The apparatus according to claim 10 wherein the aforesaid primary evaluation index definer carries out weighting of said evaluation index by calculating, for each evaluation index, score indicating correlation between said desired quality information obtained by conversion and said evaluation index.

12. The apparatus according to claim 11 further comprising:

an input/output unit that displays a matrix table formed by combination of said desired quality information and said evaluation indices, and that prompts user to input ranked information with respect to said matrix table.

13. A product design terminal device which uses a computer to acquire, at a user's site, information indicating wants and needs of the user with respect to a product under consideration, said product design terminal device comprising:

an input unit that prompts a user to input said wants and needs information with respect to the product by way of a wants and needs information input/output equipment provided at the product or at a product containing the product;

a sending unit that sends to a server said wants and needs information which was input from the user by way of said wants and needs information input/output equipment;

a storage unit that stores, in linked fashion with said wants and needs information, identification information identifying the user who input the aforesaid wants and needs information; and a point value calculator that increases the value of a point for providing positive feedback in response to input of said wants and needs information in connection with a product that is put on a market for a user identified based on said identification information.

14. A computer-readable recording medium for storing a program capable of causing a computer to perform product design processing in accordance with a desired product design concept for a product under consideration, the aforesaid product design processing comprising:

analysis processing for analyzing wants and needs information which has been input with respect to the product under consideration;

primary evaluation index selection processing for carrying out, based on said analyzed wants and needs information, weighting with respect to evaluation indices which have been previously stored in a storage device and which are quantitative measures of the degree to which a user is likely to perceive a benefit latent in the product under consideration and inherent in the aforesaid wants and needs information to have been achieved, and selecting at least one index among a plurality of such weighted evaluation indices as a primary evaluation index; and product concept definition processing for defining at least one product design concept for which the primary evaluation index selected by said primary evaluation index selection processing is a maximum or minimum, wherein the aforesaid analysis processing converts, as a result of application of a conversion rule previously stored in a storage device, said wants and needs information to desired quality information reflecting usage circumstances under which the user wishes to use the product; and said primary evaluation index selection processing uses said desired quality information to carry out weighting with respect to the aforesaid evaluation index.

15. The recording medium according to claim 14 wherein:

said primary evaluation index selection processing carries out weighting of the aforesaid evaluation index by calculating, for each evaluation index, score indicting correlation between said desired quality information obtained by conversion and said evaluation index.

16. The computer-readable recording medium according to claim 15 wherein said product design processing further comprises:

ranked input processing for displaying a matrix table formed by combination of said desired quality information and said evaluation indices, and for prompting user to input ranked information with respect to said matrix table.

17. A computer-readable recording medium for storing a program capable of causing a computer to perform product design terminal processing for acquiring, at a user's site, information indicating wants and needs of the user with respect to a product under consideration, said product design terminal processing comprising:

input processing for prompting the user to input said wants and needs information with respect to the product by way of a wants and needs information input/output equipment provided at the product under consideration or at a product containing that product;

storage processing for storing, in linked fashion with the aforesaid wants and needs information, identification information identifying the user who input said wants and needs information;

sending processing for sending to a server said wants and needs information which was input from the user by way of said wants and needs information input/output equipment; and point value calculation processing for increasing the value of a point for providing positive feedback in response to input of said wants and needs information in connection with a product that is put on the market for a user identified based on said identification information.

* * * * *